United States Patent [19]
Ferrel et al.

[11] Patent Number: 5,860,073
[45] Date of Patent: Jan. 12, 1999

[54] STYLE SHEETS FOR PUBLISHING SYSTEM

[75] Inventors: Patrick J. Ferrel, Seattle; Matthew W. Gertz; Robert F. Meyer, both of Redmond; Stephen J. Millet, Seattle; Kevin M. Schofield, Bellevue; John P. Shewchuk; Walter W. Smith, both of Seattle, all of Wash.

[73] Assignee: Microsoft Corporation, Redmond, Wash.

[21] Appl. No.: 503,452

[22] Filed: Jul. 17, 1995

[51] Int. Cl.[6] .................................................. G06F 15/00
[52] U.S. Cl. ...................... 707/522; 707/513; 707/516; 707/526
[58] Field of Search .......................... 395/774, 776–778, 395/779, 784, 788; 707/522, 526, 513, 516

[56] References Cited

U.S. PATENT DOCUMENTS

| | | | |
|---|---|---|---|
| 4,710,885 | 12/1987 | Litteken | 395/774 |
| 4,723,210 | 2/1988 | Barker et al. | 395/776 |
| 4,739,477 | 4/1988 | Barker et al. | 395/611 |
| 4,969,093 | 11/1990 | Barker et al. | 395/800 |
| 5,033,008 | 7/1991 | Barker et al. | 395/785 |
| 5,129,052 | 7/1992 | Barker et al. | 395/776 |
| 5,133,051 | 7/1992 | Handley | 395/776 |
| 5,181,162 | 1/1993 | Smith et al. | 395/792 |
| 5,339,392 | 8/1994 | Risberg et al. | 395/333 |
| 5,347,632 | 9/1994 | Filepp et al. | 395/200.32 |
| 5,491,785 | 2/1996 | Robson et al. | 395/507 |
| 5,557,722 | 9/1996 | De Rose et al. | 395/774 |
| 5,621,875 | 4/1997 | Mason et al. | 395/793 |
| 5,630,103 | 5/1997 | Smith et al. | 395/500 |
| 5,644,776 | 7/1997 | De Rose et al. | 395/761 |

OTHER PUBLICATIONS

Lie, "Cascading HTML style sheets—a proposal", http://www.w3.org/People/howcome/p/cascade.html, 10 Oct., 1994.

Gifford, "Polychannel systems for mass digital communication", Comm. of ACM, v.33, n. 2, p. 141(11), Feb. 1990.

Jackson, "The Published Word", PC User, n. 137, p. 32(4), Jul. 18, 1990.

*Journalist User's Guide: Your Personalized Newspaper for Compuserve®*, PED Software Corp., pp. 1–111, Jan. 1994.

Hüser et al., "The Individualized Electronic Newspaper: An Application Challenging Hypertext Technology", GMD Report No. GMD–664, Jul. 1992.

Sterahn et al., "Positioning HTML Elements with Cascading Style Sheets", http://www.w3.org/pub/WWW/TR/WD–positioning, Jan. 31, 1997.

Lie et al., "Cascading Style Sheets, level 1", http://www.w3.org/pub/WWW/TR/REC–CSS1, Dec. 17, 1996.

Hughes, "Thinking about style sheets", http:www.w3.org/Style/mail/kh–2–May–95.html, May 2, 1995.

Duncan, Rey, "Power Programming: An HTML Primer," PC Magazine, Jun. 13, 1995, pp. 261–270.

Microsoft ®Word, "About Styles" Chp. 9, pp. 178–183 and Document Templates Chp. 10, pp. 205–224, User's Guide, 1993–1994, Microsoft Corporation.

*Primary Examiner*—Joseph R. Burwell
*Attorney, Agent, or Firm*—Banner & Witcoff Ltd.

[57] ABSTRACT

The use of style sheets in an electronic publishing system is described. A style sheet is a collection of formatting information, such as font and tabs in a textual document. The style sheets described herein are applied to individual display regions (controls) on a page. Unlike previous systems, the display regions in this system do not contain any text at the time the style sheet is applied. Rather, the text, or other media such as graphics, is poured into the display region when the title is rendered on the customer's computer.

35 Claims, 20 Drawing Sheets

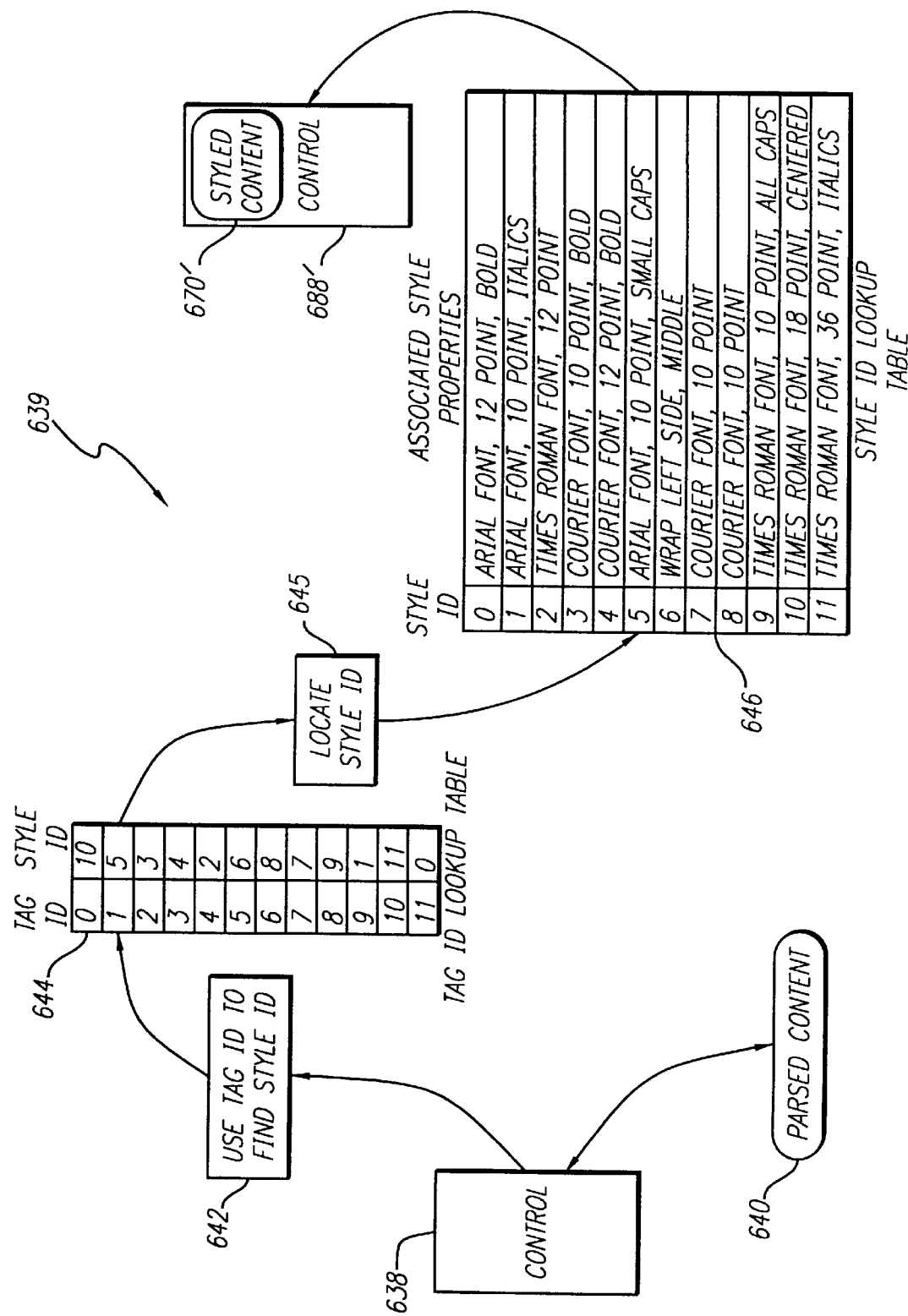

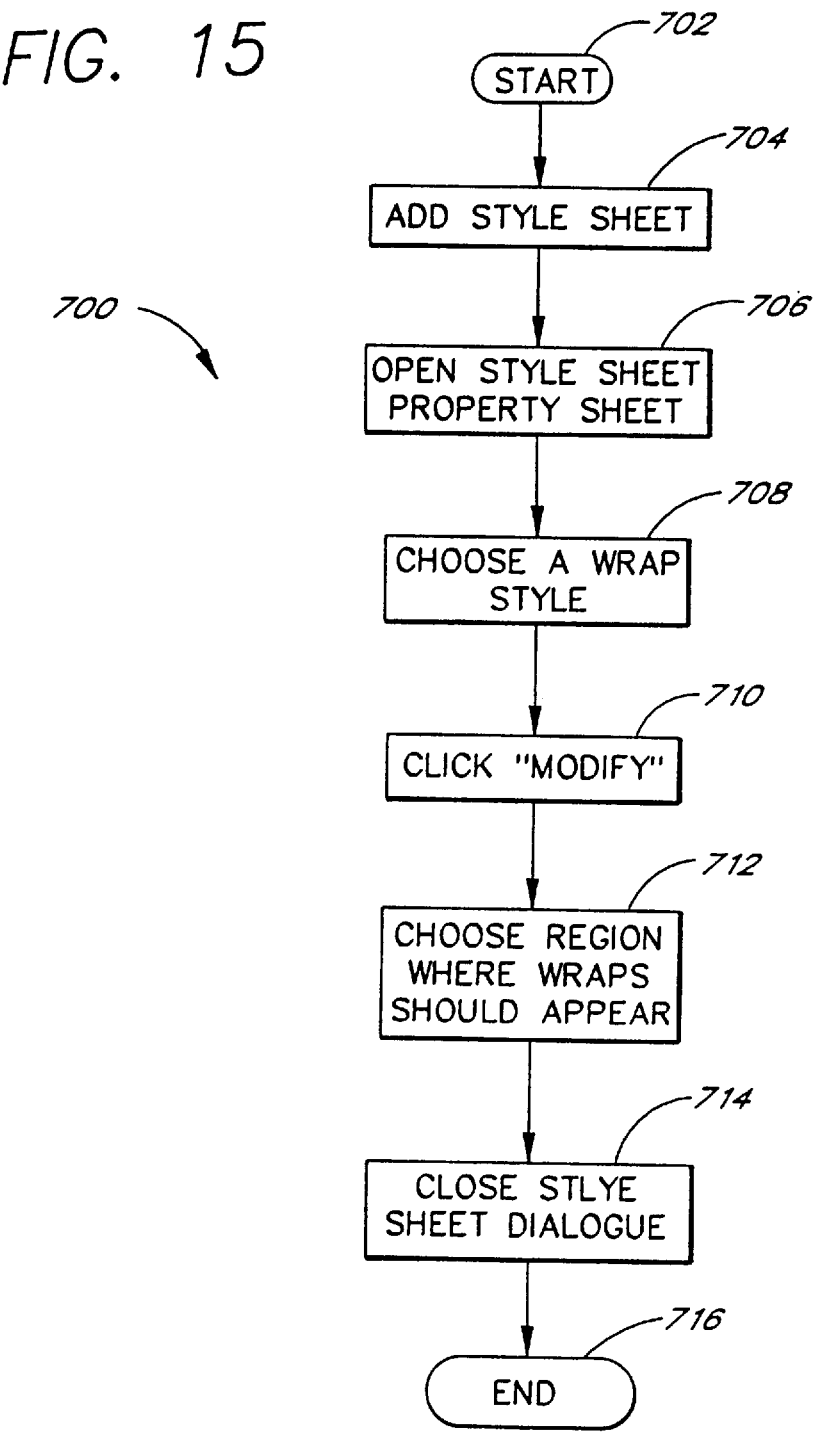

STYLE SHEETS FOR PUBLISHING SYSTEM

BACKGROUND OF THE INVENTION

1. Field of the Invention

The present invention relates to electronic publishing systems and, more specifically, to using style sheets in an on-line publishing system.

2. Description of the Related Technology

Many different systems exist for publishing documents on a computer system. These systems are used to, for example, create newsletters or brochures to promote a particular company. In addition, publications can be used to disseminate information to a variety of customers. A number of programs exist for allowing a user to design complicated layouts for a particular application. Well-known programs such as Microsoft Publisher®, Ventura Publisher®, PageMaker®, and PrintShop® help a user to produce attractive newsletters and brochures.

These publication systems let the user define particular regions of every page for a specific purpose. For example, the user can place a graphic frame that runs along the top of the page to hold a particular image. Such an image may include the title of the newsletter or another related aspect of the newsletter. In a similar way, the user may define other areas of the first page to include one or more text frames for holding text-based information such as the words from particular story. The user designs the text frame to have certain properties, such as height, width, background color, foreground color and other such properties so that the text becomes attractively formatted for the customer. In addition, the user can format the text information within the text frame to have desired font and paragraph characteristics. For example, the user can highlight the characters within the text frame and define that font to be, for example, bold-faced. The user can also choose to only apply a character format to specific words or paragraphs within a text frame.

After defining an initial text frame in these publishing systems, the user can define additional text frames on the same page. For example, one text frame may hold the title of a story whereas the next text frame holds the name of the author and the text of the story. Although this layout is straightforward to prepare, it is also very difficult to modify once it has been produced.

Some word processing programs such as Microsoft Word® and WordPerfect® have incorporated some publishing features into their software. One feature that has been incorporated into the Microsoft Word wordprocessor is the use of style sheets to mark regions of documents with specific character or paragraph properties.

A style sheet, as used in Microsoft Word, is a compilation of character and paragraph styles, with each style containing properties for formatting marked text. These style sheets are associated with a particular document to define how marked characters and paragraphs are displayed to the user. However, current word processing software only allows one style sheet to be applied to any document or to multiple documents. There is no provision for applying more than one style sheet to different sections of the same document. Thus, all text in a document that is marked with a particular style will be formatted with the same character or paragraph properties defined by that style.

Microsoft Word also allows for limited customization of the colors that are used for displaying text in a document. The author of a document may choose any of the standard 16 colors for a piece of text, or may set the color to "Auto". Setting the colors to "Auto" in Word will cause the selected text to be displayed in the standard "Window Text" system color. The system colors are designated by the Microsoft Windows® user in the control panel. However, the user is not able to set any other part of the Word document to default to system colors other than "Window Text".

Another category of publication systems include software for electronically publishing stories across on-line networks such as CompuServe, America On-Line, or the Internet. Most of these systems create and display stories that are formatted in a Standard Generalized Markup Language (SGML) or Hypertext Markup Language (HTML). Both the HTML and SGML are standards for tagging text in documents to be displayed in an on-line network. Documents that are formatted in HTML or SGML can be viewed by several widely distributed browsers such as Mosaic and NetScape for the Internet. These browser programs read SGML and HTML tagged documents and display them with proper formatting.

Several programs exist for producing documents that are tagged in either the SGML and HTML format. Programs such as Interleaf's WorldView 2 allow a user to create an SGML document with, for instance, bold-face text and hyperlinks to other documents. Once a document has been saved in an SGML format, it can be read by either the Mosaic or NetScape browser. Unfortunately, all of the formatting commands for text or graphics in an SGML or HTML document are embedded within the document. The Mosaic or NetScape browsers do not reformat these tagged documents, but rather only display the commands embedded in the SGML or HTML documents to a user. For this reason, the designers that produce the SGML and HTML documents must add formatting commands to every new document. In addition, there is little flexibility to change the document's formatting once the tagged document has been produced. Therefore, the process of creating documents for display using SGML or HTML is very inefficient for the document designer.

Other commercially available software programs for producing on-line publications are available in the marketplace. One type of electronic publisher that generates its own specific format of text while retaining the specific layout of the document is the Adobe Acrobat™ software package. Acrobat™ reads and stores documents in a specialized format known as the Portable Document Format (PDF) for use on the Internet. Other electronic publishing programs are produced by Interleaf, Inc. (Waltham, Mass.), Farallon Computing (Alameda, Calif.) and Common Ground Software (Belmont, Calif.).

Another on-line information system is described in U.S. Pat. No. 5,347,632 by Filepp et al. This patent discusses an interactive computer system network which enables a user to display news information and perform transactional services through a personal computer. However, in the Filepp system the news information is integrated into the display regions.

The invention described in U.S. Pat. No. 5,347,632 includes procedures for formulating objects that have been specially structured to include display data, control data and program instructions. Unfortunately, this system does not provide a separation of the content being displayed from the design. Therefore, the same design layout cannot be shared among disparate pieces of content.

The content displayed in this system is therefore difficult to modify because new design layouts must be transmitted to the users across slow communications lines for every piece of information viewed on the computer monitor. If the content of the information was separated from the design layout, the design layout objects could reside locally on the user's computer and be available whenever required by a specific piece of content. Similarly, it is difficult to update the character and paragraph styles of the objects in this system because the content of the information is not separated from the design layout. These disadvantages are overcome by the present invention.

SUMMARY OF THE INVENTION

A style sheet is a collection of formatting information, such as fonts and tabs in a textual document, that can be manipulated and applied as a single unit. Presently known style sheets, such as those used in Microsoft Word, are associated with particular documents. In contrast, style sheets of the present invention are applied to individual display regions (controls) on pages within titles (e.g., the Wall Street Journal is an example of a title). The display regions in a page do not contain any text at the time the style sheet is applied. Rather, the text is poured into the region when the title is displayed (also termed rendered) on the customer's computer.

More than one display region, on the same page or on different pages within a title, may use the same style sheet. A title may also contain more than one style sheet, and the publisher is free to associate each display region on the page with any particular style sheet in the title. Additionally, style sheets can be shared between titles. Important benefits derived from this invention include efficient delivery and personalization of the published title.

One embodiment of the present invention is a method of styling content, comprising the steps of creating a first style sheet container storing a plurality of styles, creating a second style sheet container storing a plurality of styles, creating a content container storing content and a plurality of tags, each tag identifying a portion of the content, linking the content container with the first and second style sheet containers, linking each tagged content portion to a selected one of the styles, applying each selected style to each tagged content portion, and displaying the styled content.

Another aspect of the present invention is a viewer for viewing titles, comprising a content object, a style sheet stored separately from the content, a first control linking to the style sheet and displaying styled content, a second control linking to the style sheet and displaying styled content.

Yet another aspect of the present invention is a method of publishing and viewing titles in an electronic publication system including a storage, comprising the steps of creating a content object, creating a style sheet object independent of the content object, linking the style sheet object to a control object, linking the content object to the control object, storing the objects in the storage, retrieving the objects from the storage, applying the linked style sheet to the content, and displaying the styled content with the control.

Still another aspect of the present invention is an electronic publication system, comprising a publication storage, a content editor generating one or more documents containing content, a project editor generating a title layout, wherein the content documents are linked to the title layout in a title, wherein the title layout includes the setting of system colors, and wherein the title is released to the publication storage as separately stored title layout and content documents, and a viewer retrieving the separately stored title layout and content documents from the publication storage, wherein the viewer renders the title layout and content documents as a displayable title, and wherein the system colors set in the title layout are associated with colors set external to the viewer.

Another embodiment of the present invention is a method of styling content in an electronic publishing system, comprising defining a control region, linking the control region to a style sheet object, wherein the style sheet object includes a plurality of styles, associating the control region with content, and displaying a portion of the content, wherein the displayed content portion is styled with at least one of the styles.

BRIEF DESCRIPTION OF THE DRAWINGS

FIG. 12c is a diagram of the process that a control uses to retrieve style properties from a style sheet.

FIG. 15 is a flow diagram of the wrap edit process performed by the designer to include a wrap style in a style sheet using the style sheet editor shown in FIG. 2.

DETAILED DESCRIPTION OF THE PREFERRED EMBODIMENTS

Figure 1:
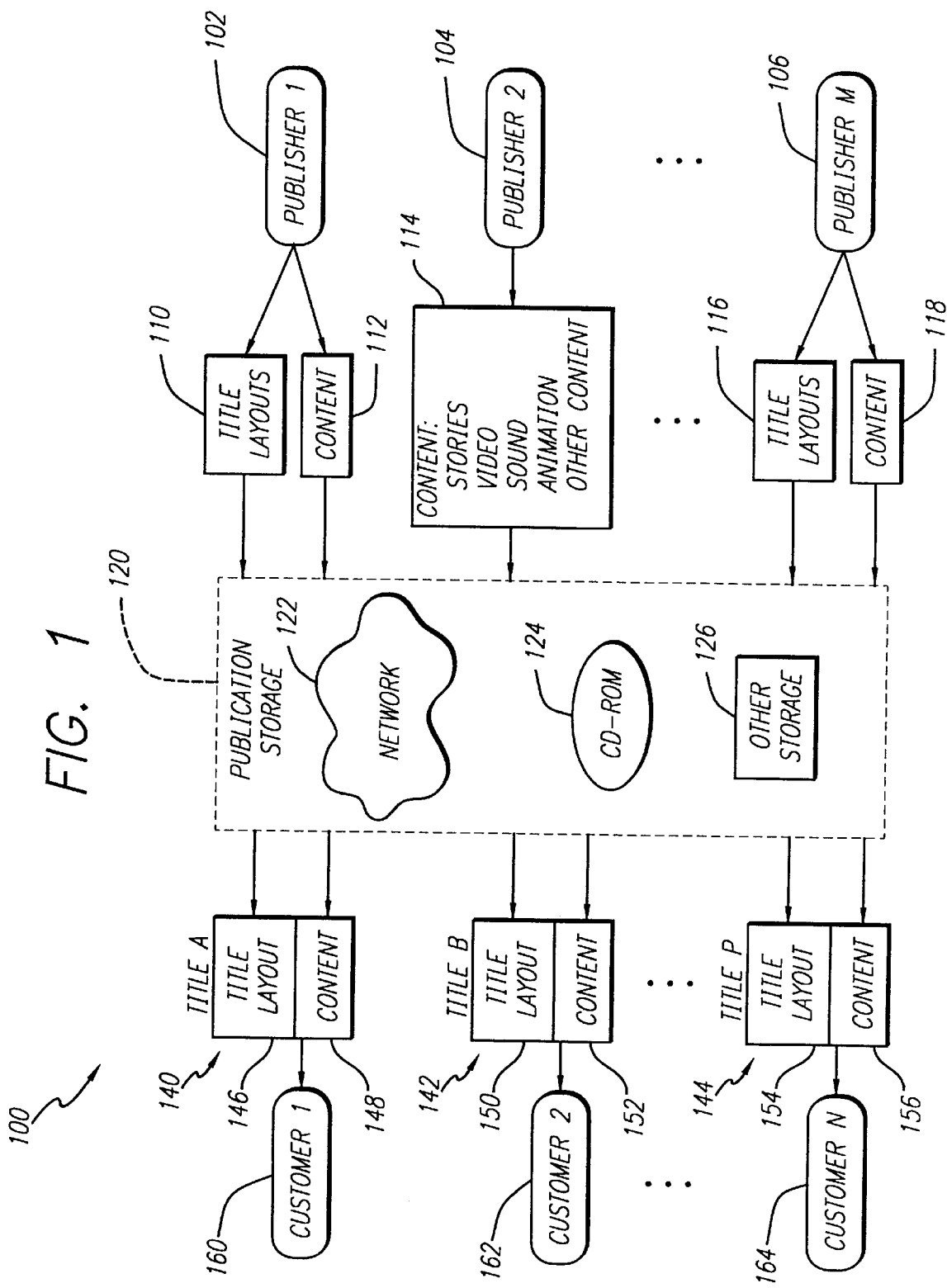
FIG. 1 is a block diagram of the basic system configuration of the multimedia publishing system (MPS), which is the presently preferred underlying architecture for the present invention.

Reference is now made to the drawings wherein like numerals refer to like parts throughout. For convenience, the following description will be organized into the following seven principle sections: Acronyms, Advantages of the Multimedia Publication System, Multimedia Publishing System Overview, Style Sheet Overview, Style Sheet Object, Applying Style Sheets to Content, Displaying the Styled Content, Assigning Colors in a Control and Summary.

The discussion in the first three sections is general background of the preferred Multimedia Publication System (MPS). The remaining sections focus on the preferred implementation of style sheets within the MPS.

I. ACRONYMS

The following list of acronyms is provided as a reference in reading the remaining sections.
AVI—Advanced Video Imaging.
BBS—Bulletin Board System.
MPML—Multimedia Publishing Markup Language
CF—Component Forms
COS—Caching Object Store
DBM—Database Management System
DLL—Dynamic-link Library
GUID—Globally Unique Identifier
HTML—HyperText Markup Language
ICP—Independent Content Provider
IP—Information Provider
LAN—Local Area Network
MP—Multimedia Publishing
MPC—Microsoft Network Procedure Call
MPS—Multimedia Publishing System
MFC—Microsoft Foundation Class
MSN—Microsoft Network
OCX—OLE Control
OFS—Object File System
OLE—Object Linking and Embedding
PDA—Personal Digital Assistant
RGB—Red, Green, Blue
RPC—Remote Procedure Call
RTF—Rich Text Format
SGML—Standard Generalized Markup Language
VBA—Visual Basic for Applications
WAN—Wide Area Network
WWW—World-Wide Web

II. ADVANTAGES OF THE MULTIMEDIA PUBLICATION SYSTEM

The present invention can perhaps provide the most benefit by using an on-line network. Therefore, this and the following sections present background information on a preferred on-line publication system which is a foundation upon which the present invention can reside.

To enable a new generation of on-line, multimedia applications, an end-to-end system has been invented for developing and using applications and services. The system, called the Multimedia Publishing System (MPS or MP system), preferably uses the Microsoft Network. As an open, turnkey system, MPS includes components for design, authoring, distribution, viewing, search, personalization, and billing of on-line services and multimedia applications. The MP system allows content providers to offer rich, interactive multimedia applications and services, providing users a compelling and exciting on-line experience. The MP system provides the key to overcoming the previously described hurdles facing the on-line industry.

The Microsoft Network removes the primary barriers to on-line service use. These barriers include cost, difficult user interfaces and lack of inertia. Access to The Microsoft Network is provided by Windows 95, the most recent version of the Microsoft Windows operating system thereby making it accessible to millions of customers. The Microsoft Network is designed to make accessing electronic information easy and inexpensive for any user of Windows 95.

In the MP system, Independent Content Providers (ICPs), also known as publishers, supply the system with stories, publications, newspapers, sounds, graphics movies and much more. The MP system is designed to take projects (e.g. stories, publications, etc) produced by the publishers and make them accessible to millions of users on the Microsoft Network. Thus, the basic components of the MP system are a project designer component, a public distribution site, and a viewer component. These components of the MP system are described in detail below.

One unique concept that permeates the MP system is the clean separation of content and design. In this context, content is defined as the actual data that is to be displayed to the user. The design of a project is how that information gets displayed to the user (e.g., its format on the computer screen). An illustrative example would be an electronic newspaper, wherein the content is the text and graphics of the stories, while the design is the layout and style of that data. The design of the electronic newspaper is what makes it look like a newspaper on a computer monitor, whereas the content is the data that makes up the designed screens.

In the MP system, the content and the design are stored as separate objects in the public distribution site so that many different pieces of content can be viewed with the same appearance. An object can be defined as a discrete data item or data structure which can be stored in persistent storage or in memory. The object may include computer instructions for manipulating data. Once a designer, using the project designer component at the publisher site, has created a particular page layout that is attractive, many pieces of content can be viewed from within that layout because of the separation of content from design in the MP system. The system keeps track of links between a piece of content and its associated page layout, but does not actually format the data in the content with a particular style.

As will be discussed in more detail below, the designer creates projects with design and content information for a particular publisher. Continuing the example from above, a project could correspond to an entity that owned a series of newspapers and other media businesses. Within each project, one or more titles would correspond to the actual newspaper. Each title has one or more sections, and can be thought of as similar to the sections in a standard, printed daily newspaper or other periodical such as a magazine.

Within each section are pages that define the information that is displayed to a single screen on the customer's computer visual display. When viewing a particular title, the customer will normally look at only one page of information at a time. On each page are controls which contain instructions for gathering, formatting and displaying the linked content onto the page. When a customer looks at information on a page that is provided by a publisher, the customer is really looking at content that has been formatted within pre-defined control regions on the page.

One important facet of this invention is the concept of viewing the same content objects in many different ways. As discussed above, content objects are viewed after being formatted by a particular linked control. The control knows how to format a particular piece of content by looking at the style that has been defined for that content by the designer and then comparing that style to a linked style sheet. Because each control on a page can have a different associated style sheet, different controls on the same page can each display the same linked content in varying formats. In one control, the title might be displayed using a 14 point font and bold emphasis, whereas the same piece of content in a different control on the page can be displayed in a 12 point font and italic emphasis. The ability of each control on a page to have its own associated style sheet is a powerful tool for the designer to use to format attractive content on a page.

Unlike prior publishing systems, content (such as text or graphics) in the MP system is never reformatted into the marked style. The content is only displayed to the user in the chosen style. Therefore, should the designer choose to change a particular style, only the style sheet property of that style needs to be altered. The next time that the content is displayed using the altered style sheet, the content will be displayed with the properties of the new style.

A further advantage of the MPS is that it provides the designer with the flexibility to allow customers to choose their own color schemes. Designers can choose a specific color for controls and other displayed objects, or can specify one of the system colors the end-user has customized in the Windows® Control panel. This flexibility allows the designer to give the customer the ability to adjust the color of various chosen title elements. Thus the customer can choose a combination of colors which suit their individual needs. Customers with vision deficiencies which do not allow them to view certain colors or combinations of colors will be able to display titles in specific color combinations. The system also allows the designer to assign permanent colors to controls and objects when a particular "look and feel" is important to a title. Other advantages and benefits of the MP system are discussed in detail below.

To provide more detail on the advantages of the MP system, the following section presents an overview of the Multimedia Publishing system.

III. MULTIMEDIA PUBLISHING SYSTEM OVERVIEW

This section presents an overview of the configuration and major components of the preferred Multimedia Publication System. Beginning with a description of the important concept of separating design and content, this section continues by discussing the major components and configuration of the MP system. In addition, a description of the container hierarchy is discussed in conjunction with FIGS. 1–4.

The objects utilized by the MP System include a project; title; content folder and, optionally, subfolder; section and, optionally, subsection; window; page; control; style sheet; and various content objects (such as stories, images, audio, so forth). These objects will be explained in more detail below in reference to FIGS. 1–7. It is important to realize that these objects need to be stored in a non-volatile computer memory such as a hard disk drive.

Figure 2:
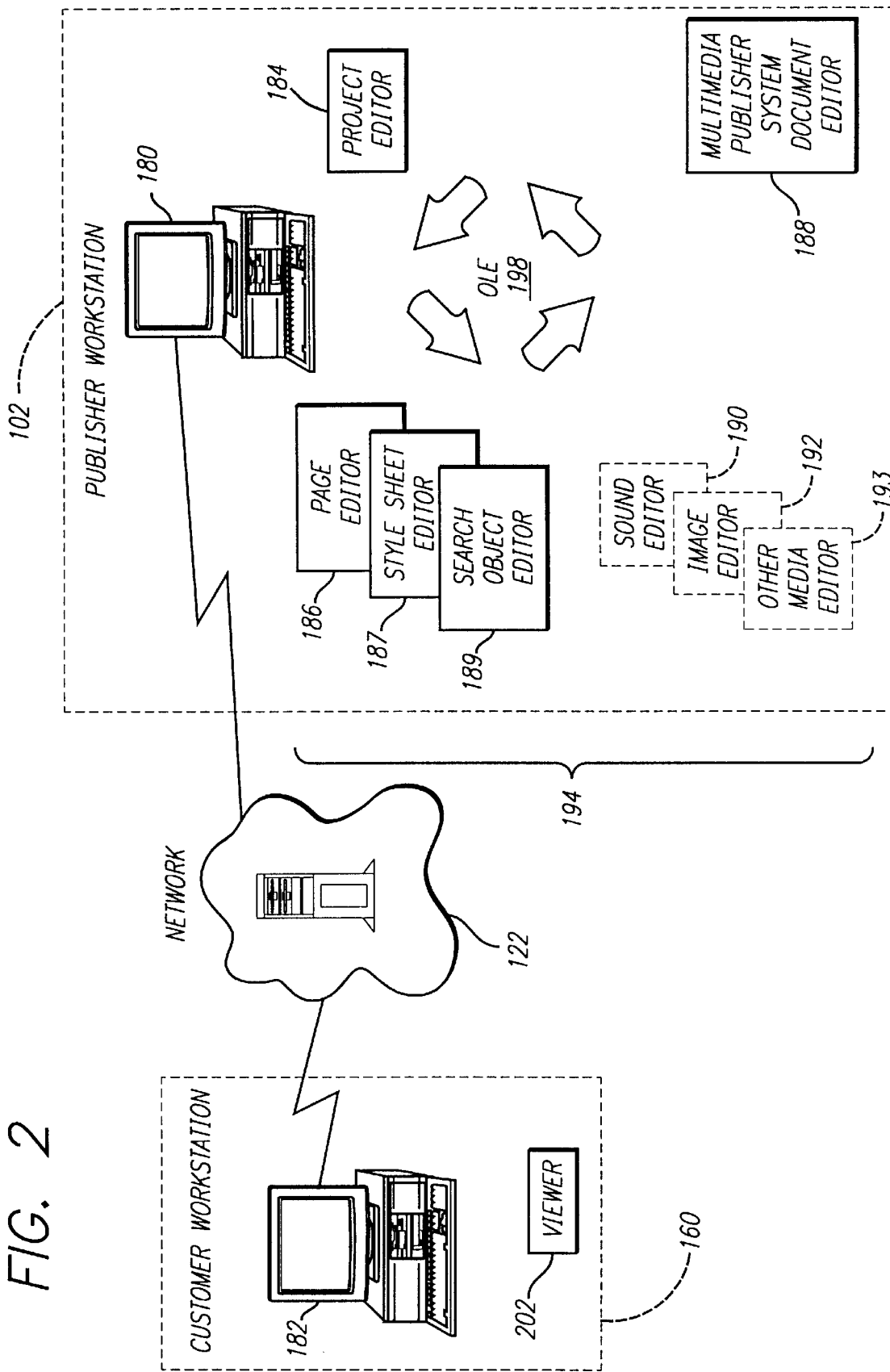
FIG. 2 is a diagram of the major system components of the MPS shown in FIG. 1.

The natural way of storing related and ordered objects is in a data structure, such as an acyclic graph. The presently preferred way of storing the MP system objects is called a caching object store (COS). The concept of a COS and how it operates to organize objects within an OLE environment is known in the art. See, for example, *Inside OLE* 2 by Kraig Brockschmidt (Microsoft Press). In the presently preferred MPS, each title corresponds to a COS. There is least one COS at the publisher workstation and in each MPS server at the publication storage and distribution center (FIG. 2). Each customer workstation also has a COS so that the customer can store and retrieve MP system objects when assembling content into controls on pages.

A title may be broadly defined to encompass a publication (e.g., newspaper), service (e.g., stock quotations) or application (e.g., multimedia encyclopedia). When a title is viewed, the viewer opens a title file which represents the title. This title file is a COS file. Typically in the on-line scenario, this would be a skeleton title. A skeleton title is a COS file which contains only a root moniker and no actual objects. A moniker is an object used in the implementation of the COS and contains identification and status information about COS objects.

A superCOS is a COS file which contains more than one COS. For example a superCOS at the customer workstation is used to cache objects which have been remotely retrieved from the host data center. As long as these cached objects are not out of date or flushed, the viewer will be able to quickly provide that object the next time it is requested rather than retrieving it from the data center again. This gives the MP system a tremendous speed advantage over other on-line systems.

Figure 5:
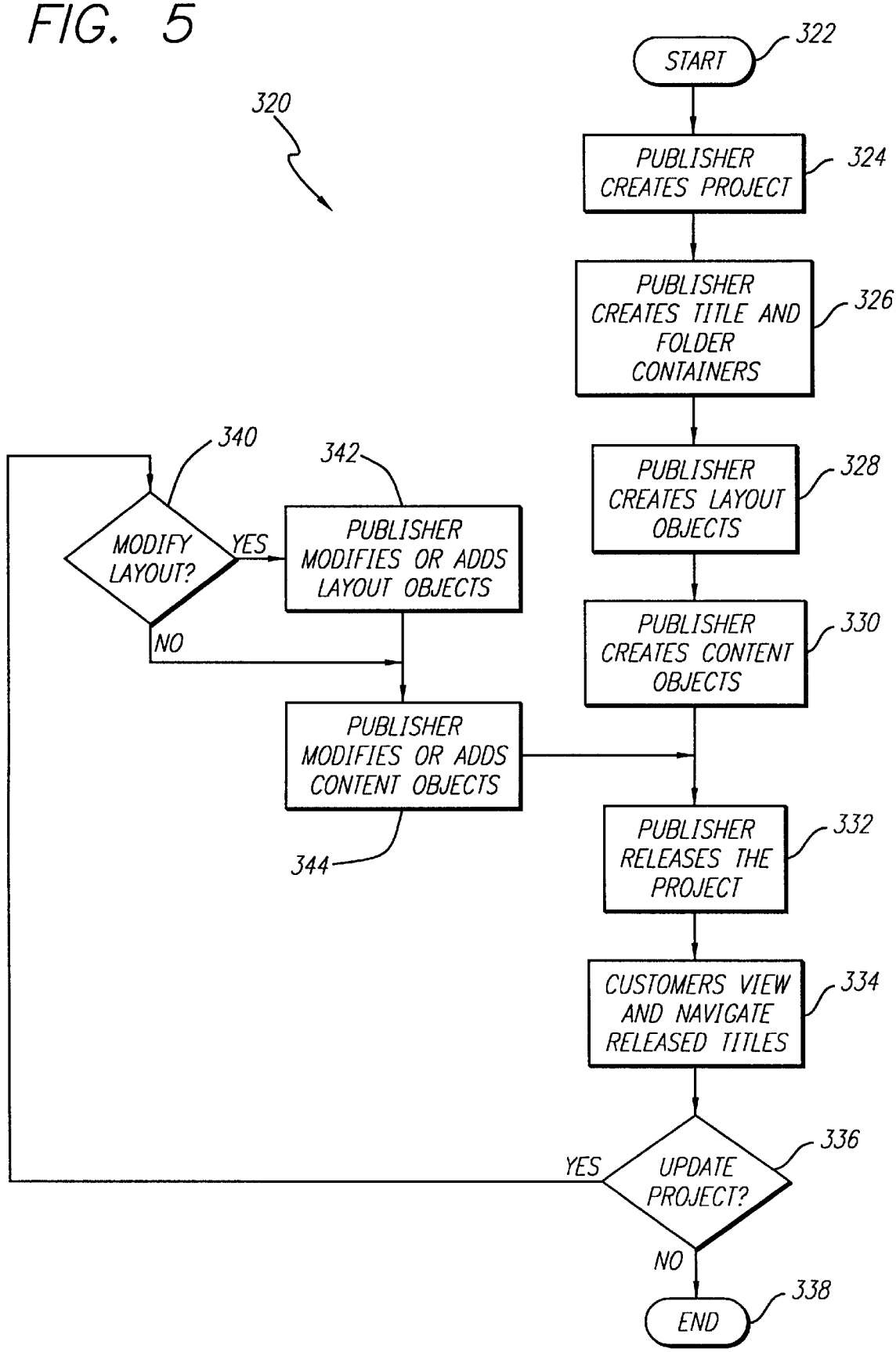
FIG. 5 is an overview flow diagram of the MPS processes performed using the system of FIGS. 1 and 2.
Figure 6:
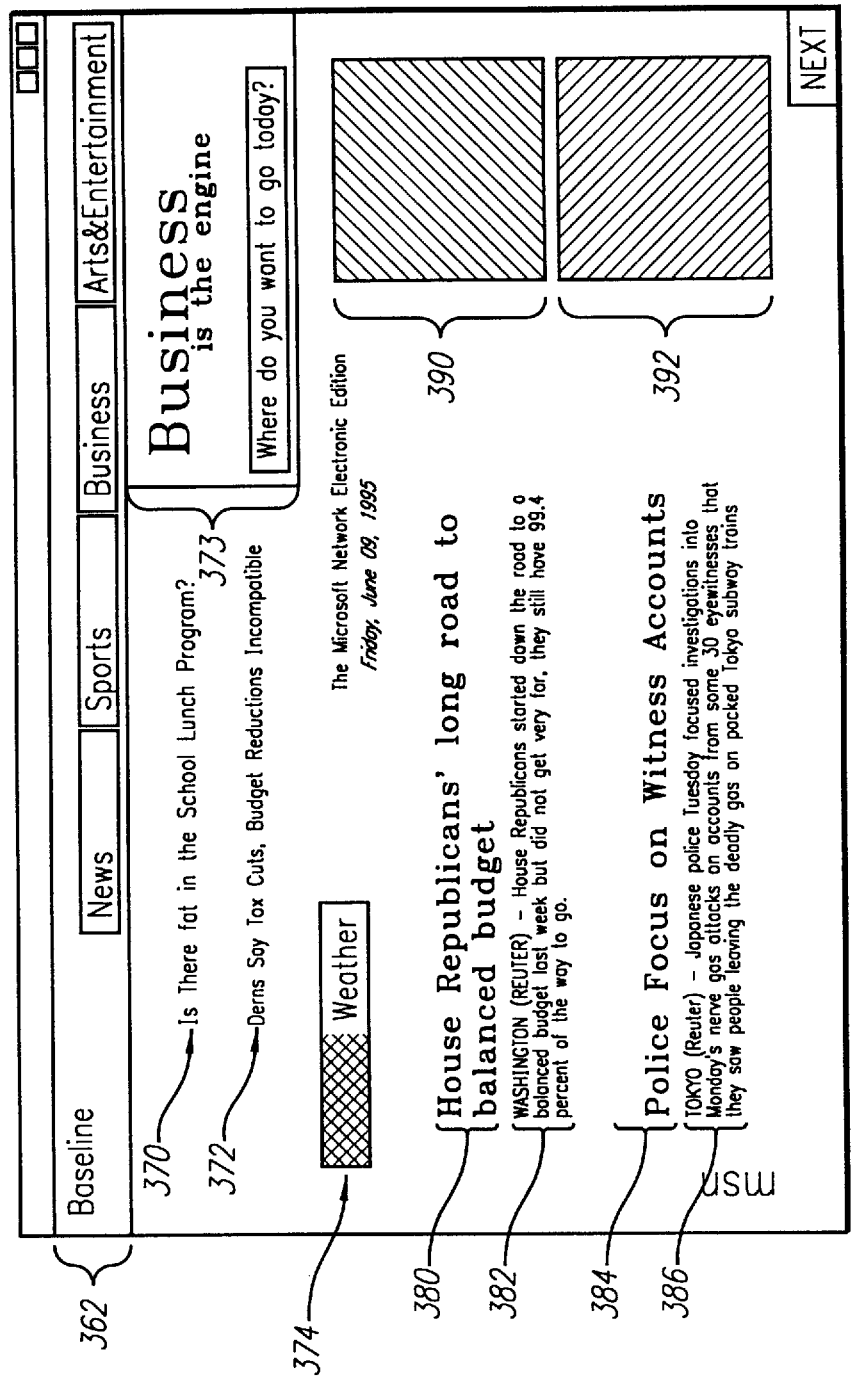
FIG. 6 is an exemplary screen display of one page of a title as displayed by the viewer of FIG. 2.
Figure 7:
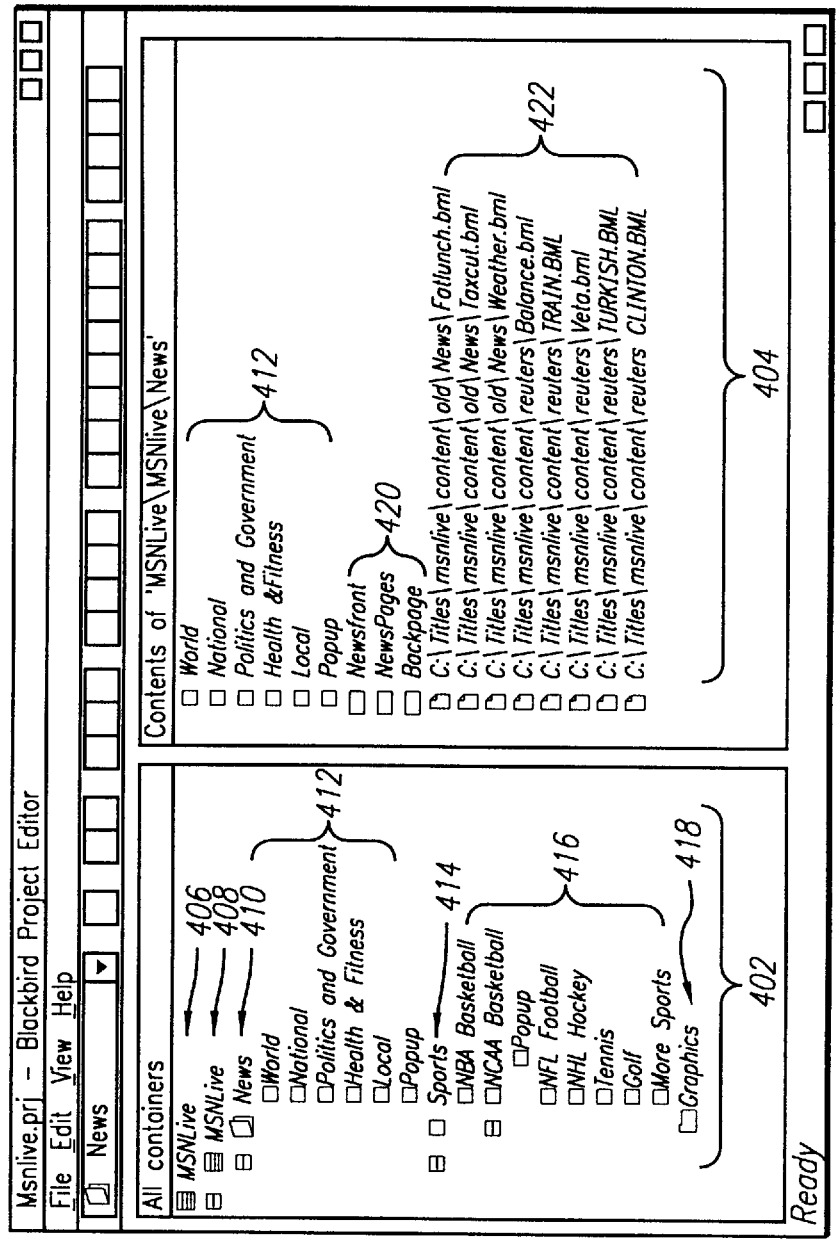
FIG. 7 is an exemplary screen display of the parts of the content and layout for the title displayed in FIG. 6.

A top level system flow diagram is presented in conjunction with FIG. 5 and exemplary Viewer screen displays that could be seen during the processes of the system flow diagram are described in conjunction with FIGS. 6 and 7. An example of the rendering process that relies on style sheets and content retrieval is presented in conjunction with FIG. 8.

A. Separation of Design and Content in the Multimedia Publishing System

As discussed above, the MPS architecture maintains a clean separation between design information and the content to which that design will be applied. A publisher's collection of page layouts is in the form of one or more titles. A title is a collection of page layouts, in a particular sequence which relates to the order in which pages will be viewed. The page layouts describe how the client area of a window will appear when a page is rendered. Rendering refers to the creation of a bitmap of a display screen in memory prior to displaying the screen. A complete page layout is created by placing controls on a blank page layout, where each control delineates an area where some piece of content should be displayed. Settings on each control determine the proper place to look for the content to be displayed in that control.

The content takes the form of discrete objects, each of which compose one unit of information, e.g., a story or a picture. These content objects are of well-known and public data formats, and may be created using any tool that supports these data formats. Content objects generally do not have formatting information encoded within them.

When the publisher has created the title (with its page layouts) and the content objects, the title and content are published together to the public distribution point. Consumers download the title and content objects to their personal computer, where the MPS viewer software uses the page layouts in the title to compose the content in the visually rich form designed by the publisher.

B. System Configuration

Referring now to FIG. 1, the basic system configuration of the multimedia publishing system (MPS) 100, which is a preferred embodiment of the system 100, will now be described. By convention, the term title is used to describe the overall plan or instructions for assembling the complete on-line MPS application on a customer's computer.

Much of the power of the MP system 100 resides in its ability to fully separate design and content, unlike existing on-line and multimedia publishing tools which require a publisher or content provider, such as a first publisher 102, a second publisher 104, or a publisher M 106 to integrate design and content. In the MP system, titles, such as a title A 140, title B 142, or title P 144 can be divided into two parts: the content (148, 152, 156)—the information such as bitmaps, video clips, audio, animation, or stories that make up a title—and the title layout, also termed the design (146, 150, 154)—the overall look and feel of a title. To separate content and design using MPS rather than placing content directly on a page, a publisher can place the content, such as a set of content objects 112, 114, or 118, in one or more containers of a title and then create sections or subsections having pages with special controls, such as a set of title layout objects 110 or 116, that dynamically find and display the content at runtime.

Using this technique a publisher can change a title on an ongoing basis by merely updating the content 112, 114, 116 which has been placed into various folders or containers within the master title. When a page is displayed, it shows the updated content. This is called dynamic title synthesis or dynamic synthesis, and allows content to be continually updated without any need to modify and update the title design consisting of the individual pages, controls and hand-placed content used to display the content.

When publishers use dynamic synthesis they are creating titles which contain placeholders that will be filled-in by the changing content. When dynamic synthesis is utilized, a title is used as a template and a pressing is the displayed, filled-in title. Each time the publisher updates the content in a title and makes it available for customers, such as a first customer 160, a second customer 162 or a customer N 164, the publisher is creating a new release of that title. When the customer starts to view that release, a "pressing" is made which contains part or all of the content in the release.

A major advantage of this approach is flexibility. Some parts of a title may be created by hand-placing content directly on a page, and other parts may be created using dynamic synthesis. Notice, however, that content hand-placed directly on pages is static—it changes only when the people involved in creating the title update the pages.

Returning to the creation of title layouts and content by the publisher, after creation, the title layouts 110, 116 and content 112, 114, 118 are released and stored in a publication storage 120. The storage 120 can be implemented in many forms, such as a network 122, CD-ROM 124, and other means of storage, such as bulletin boards, magnetic media, cable television and so forth. The presently preferred network 122 is the Microsoft Network (MSN), which is part of Windows 95. Many customers will use a MSN Explorer tool to acquire and activate MPS applications.

The MSN Explorer is the integrated navigation tool within Windows 95 that is also used to browse the MSN hierarchy. Sophisticated customers may use other more advanced MPS features, such as search, scheduling, and automatic delivery, assuming these features have been activated by the publisher. Besides browsing via the Explorer or scheduling automatic home delivery, there are several additional ways customers can obtain MPS applications. For example, an individual application may be distributed via floppy disk or CD-ROM 124, it may be distributed through E-mail or bulletin boards, or the application may be directly accessible via a link in other applications (such as the Microsoft Network yellow pages system). In each of these situations, the MP system 100 acquires an application for the customer.

C. System Components

Referring now to FIG. 2, the preferred basic components of the MP system 100 will now be described. The system 100 includes a set of tools for designing, developing and viewing multimedia on-line applications. A publisher, such as the publisher 102, utilizes a publisher workstation 182 and a Designer software environment 194 to create and publish the title layouts 110 and content 112. In the system 100, a publisher could possibly just create content and use the title layouts of another publisher. The title layouts and/or content are preferably stored in a network 122 that includes a high-performance server for hosting on-line applications. The preferred network 122 will be further described in conjunction with FIG. 3. A customer, such as customer 162, utilizes a customer workstation 182 and a runtime Viewer software component 202 to find and activate MPS titles, stored on the network 122, on a visual display at a workstation 182.

The Designer 194 is an extensible design and development environment that includes several preferred software components. These include a project editor 184 to manage tiles, containers, and objects; a page editor 186 to create and layout pages; a word processor, such as Microsoft MPS Word, for creating content optimized for the MP system 100; and optional third-party tools, such as a sound editor 190, an image editor 192, and another media object editor 193 to create and modify sound, image, video, animation and other content objects. For authoring textual content, the preferred text editor is an enhanced version of the Microsoft Word 6.0 wordprocessing program for creating tagged, hypertext documents. Together, these programs form the Designer Component 194.

The project editor 184 is used to invoke a style sheet editor 187 that is used to create and edit style sheets. The style sheet editor 187, and portions of the project editor 184 and page editor 186 will be described in detail in subsequent sections of this discussion.

The MPS Designer 194 is a page or forms-based development system similar to Visual Basic. The development environment is graphical and easy to use. Controls, which represent the components of a MPS application that will appear on-screen, are laid out within MPS pages. MPS pages and controls are preferably based on Object Linking and Embedding 198 (in FIG. 2) (OLE), Microsoft's component software technology. OLE, which presently is at version 2, is further described in *Inside OLE* 2 and *OLE 2, Programmer's Reference*, Volumes 1 and 2, all of which are published by Microsoft Press, and are hereby incorporated by reference. However, other compound document architectures such as OpenDoc could be used as well.

The MP system 100 includes a number of pre-packaged controls such as navigation controls, rich-text controls, multimedia controls, and other special controls specifically designed to support the creation of MPS applications. Because MPS is based on OLE, third parties can also design their own controls for use within MPS (using the Microsoft OLE Control Development Kit that is bundled with Microsoft Visual C++ 2.0). In this way, the MPS development environment is fully extensible so that customers can add new capabilities to their MPS applications by purchasing additional controls from third parties or by creating their own controls. The MPS development environment also includes a Visual Basic for Applications (VBA) scripting and debugging system.

While content is displayed within controls that have been laid out on MPS pages in the MPS Designer 194, content can be authored in any number of existing Microsoft and third-party tools. One such tool for authoring hypertext is an enhanced version of Microsoft Word that supports special MPS features for creating and tagging MPS text. Other existing tools for creating bitmaps, complex drawings, and other multimedia content can be used to create the content displayed within any particular OLE Control. In addition, most existing OLE Controls (.ocx executable programs) will work in the MPS environment although they may not be optimized for on-line applications. For example, a standard AVI OLE Control could be placed in an MPS application.

The controls that are part of the MP system 100 are optimized for low bandwidth on-line delivery of data. However, it should be noted that a other high bandwidth data delivery systems could be used without departing from the spirit of the present invention. The MPS 100 is designed to operate with information that can change from minute to minute, daily, or monthly. So while MPS can be used for creating static titles that are hand-crafted and cannot be easily updated on an ongoing basis, the main focus of the MP system 100 is to provide an efficient, cost-effective mechanism to manage the creation and management of dynamic, continually changing on-line applications. At the same time, as an open development environment, many of the tools commonly used for creating static multimedia content can easily be incorporated into the MP system 100.

When activated by the customer, the Viewer 202 examines the components of a selected title to see if any of the information required to display the pressed title needs to be acquired. It then acquires this information from publication storage 120 or local storage at customer workstation 182 and organizes it so that it can be displayed to the customer 162. Thus a pressed title captures the set of information that is displayed to the customer at a given point in time. In other words, some titles might produce a new pressing every day, or more frequently as the content changes. On the other hand, other titles may be static; when a static title is activated there is no need to do another pressing, once the content has not changed.

While pressing a static title may seem unnecessary, the process of organizing and displaying the pressing can take into account customer preferences and display device characteristics. For example, suppose a customer activates a static title on a laptop when using the laptop screen and then later activates the same title when the computer is attached to a larger display. The second activation will result in another pressing to take into account the much larger screen area if the publication has enabled such an option. When the title is activated, the MPS Viewer 202 determines if the title is out of date; acquires any needed information; and then, if necessary, creates and possibly personalizes the pressing.

The MPS Viewer 202 enables customers to perform the following actions within the limits defined by content providers: select and personalize the information a title acquires, modify the overall structural properties of titles, personalize the look and feel of titles, manage and archive the content customers acquire, and view billing and pricing information.

The requirement for the preferred publisher workstation 180 is a Windows 95 workstation with the minimum hardware configuration necessary to run the MSN sysop tools and to store and display the titles under development. The preferred Windows 95 workstation has, at a minimum, an Intel 486 processor running a 33 MHz or better with eight Megabytes of memory. A 9600 baud or faster modem is required to run the MSN sysop tools. For multimedia titles, this includes a MPC2 compliant (multimedia configured) workstation.

The MPS Viewer 202 should be installed on the customer workstation 182 before an MPS title is activated. The presently preferred customer workstation is capable of running Windows 95. To make this installation easy, the Viewer 202 is automatically installed onto the customer workstation 182 the first time the customer connects to MSN and the MP system 100 is enabled. MPS titles may include resources such as fonts, Dynamic Link Libraries (DLLs), and OLE controls that are placed into the resource container or folder of MPS titles. Before customers can view such titles, these resources are installed on their workstation 182.

D. Network Storage

Figure 3:
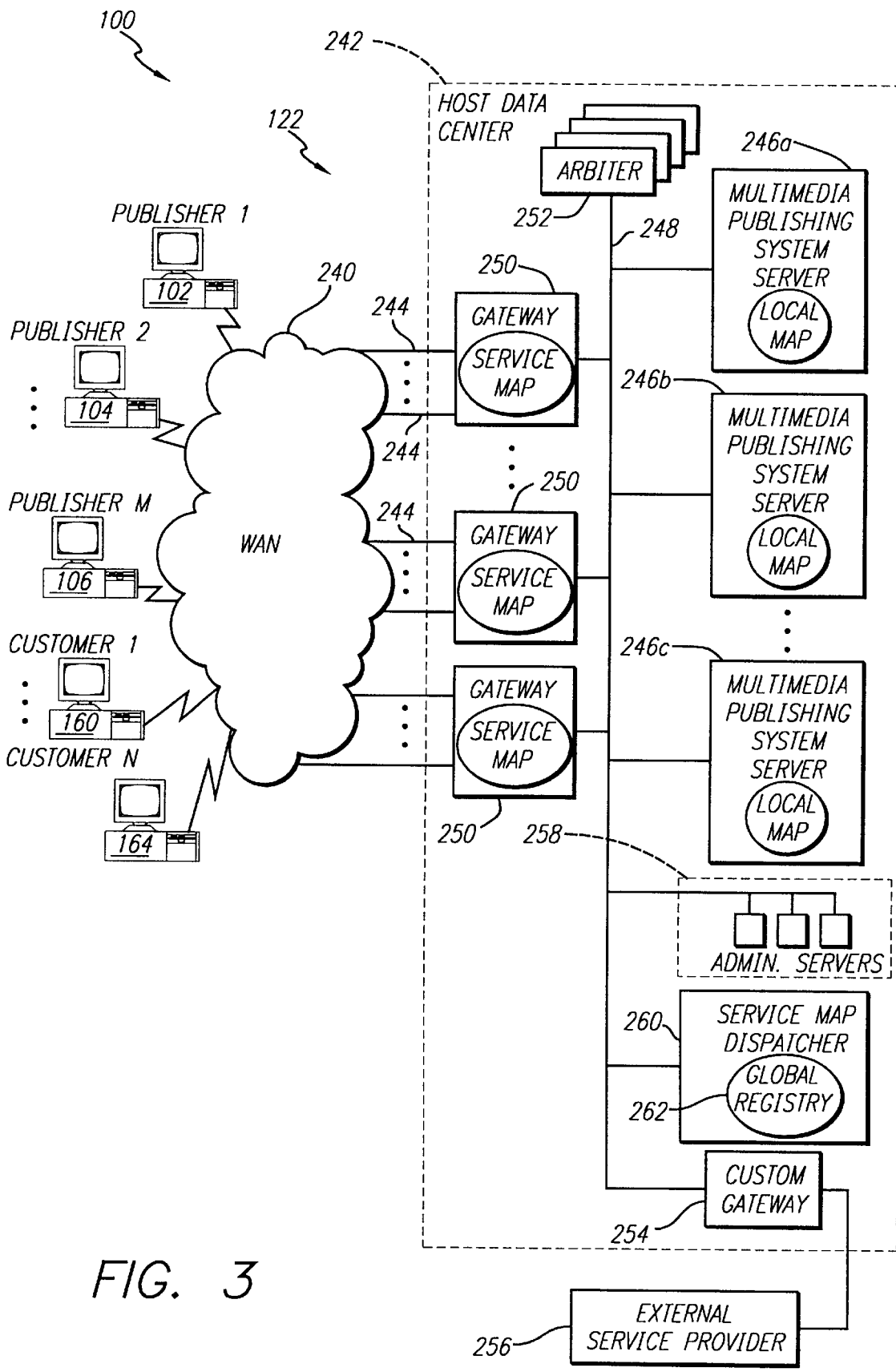
FIG. 3 is a diagram of an exemplary on-line system, for publication storage and distribution.

Referring to FIG. 3, an exemplary network storage subsystem 122 will be described. FIG. 3 is a high level diagram illustrating the basic components of an on-line network 122 in accordance with one embodiment of the invention. Multiple publisher workstations 102, 104, 106 and customer workstations 160, 164 are connected to a host data center 242 by a wide area network (WAN) 240. The publisher workstations preferably have high speed connections to the WAN 240. The wide area network 240 includes WAN lines 244 which are provided by one or more telecommunications providers, and which allow end users (i.e., publishers and customers) over a wide geographic area to access the host data center 242 via modem. The WAN lines 244 preferably include both X.25 lines and ISDN (Integrated Service Digital Network) lines.

The host data center 242 comprises a plurality of application servers 246 connected to a high speed local area network (LAN) 248 (which may include multiple LANs). Each application server 246 has a unique server ID. As shown in FIG. 3, three of the servers 246 are MP System servers (246a, 246b and 246c). Also connected to the LAN 248 are multiple Gateway computers 250 also referred to as Gateways, which link incoming calls from end users to the application servers 246.

It is envisioned that the host data center 242 may advantageously have on the order of one hundred Gateways 250, and between several hundred to several thousand application servers 246. A host data center of this type will be able to handle tens of thousands of simultaneous user logon sessions.

As described below, the server side of each on-line service is preferably implemented using one of the following: (1) a single application server 246, (2) a set of "replicated" application servers (i.e., application servers which run the same service application or applications) that provide access to replicated (and locally-stored) copies of service "content" data (i.e., data provided to end user's of the service), or (3) a set of replicated application servers that provide access to server-specific (non-replicated) service content data.

The host data center 104 also includes multiple Arbiter computers 252 that monitor, record and process certain types of transactions to ensure consistency among replicated application servers. The host data center 104 also includes one or more custom Gateway computers 254 which link the host data center 104 to one or more external service providers 256, such as a credit card service that validates and executes credit card transactions.

The host data center 104 also includes a number of administrative servers 258. The administrative servers 258 perform administrative functions such as accounting, billing, network management, backup, system security, performance analysis, and server-to-service allocation.

To route user service requests to the appropriate servers 246, the Gateways 250 must have some way of determining the unique IDs of the servers that are currently handling the requested services. This is accomplished by means of a service map (not shown), which contains information about every service and server 246 in the host data center 242.

The service map is preferably generated by a service map dispatcher 260, which may be implemented on a single computer.

In addition to generating a service map, the service map dispatcher 260 maintains a central repository of information referred to as the "global registry" 262. The global registry 262 contains various information about the present configuration of the host data center 242. For example, for each service group, the global registry 262 indicates the IDs of the servers 246 of a service group, and the identity of the Arbiter computer 252 (if any) which is assigned to the service group.

Further disclosure of the preferred network 122 is provided in a copending application also assigned to the assignee of the present application, Microsoft Corporation, entitled "Architecture for Scalable On-Line Services Network", U.S. Ser. No. 08/472,807, filed on Jun. 7, 1995.

E. Container Hierarchy

Figure 4:
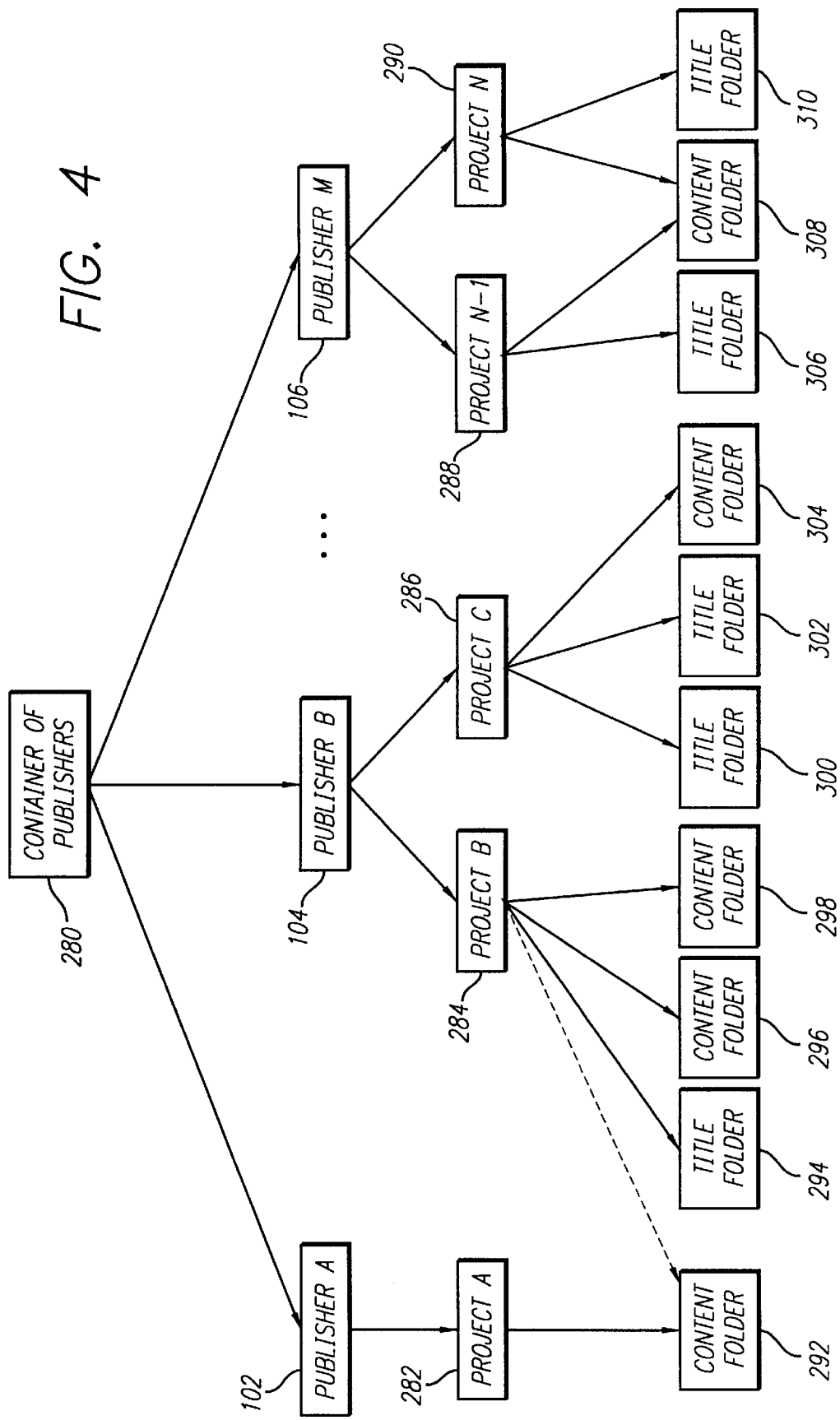
FIG. 4 is block diagram of a hierarchy of containers or folders for a plurality of publishers using the system of FIGS. 1 and 2.

Referring now to FIG. 4, the high level hierarchy of containers for a plurality of publishers using the MP system 100 will be described. In the presently preferred embodiment, the MP system 100 utilizes a specific directory structure with the MSN directory tree. This structure is rooted at a specific folder (specified via the MSN global registry 262) known as a container of publishers 280. Every publisher 102, 104, 106 will have at least one container or folder called a project. For example, the publisher 102 has a folder called Project A 282, the publisher 104 has two folders called Project B 284 and Project C 286, and the publisher 106 has two folders called Project N-1 288 and Project N 290. Content folders and/or titles are dropped into the folder of the publisher.

Allowing for multiple projects satisfies the needs of a large publisher. For instance, a project could be assigned to one magazine (e.g., gardening) and another project could be assigned to another magazine (e.g., motorcycling). Thus, each month's issue could be archived as a title according to volume and number in its respective project.

As an example of how projects could be configured, Project A 282 only has a content folder 292; Project B has a title folder 294, and two content folders 296 and 298, along with a link to the content folder 292 of publisher A 102; Project C has two title folders 300 and 302 that could share a content folder 304; Project N-1 has a title folder 306 and a content folder 308; and Project N has a title folder 310 and shares content folder 308 with Project N-1. Publisher 102, for example, could be a provider of raw statistics in content folder 292 but does not want to generate title layouts. The publisher 102 may have an agreement with the publisher 104 for the publisher 104 to allow access and use of the content in the content folder 292. The publisher 106 has two projects 288 and 290 that share the content folder 308, for example, due to the common subject matter of titles in title folders 306 and 310. As illustrated in FIG. 4, a project, such as the project 286, may contain multiple titles folders.

F. Top Level Flow Diagram

Referring now to FIG. 5, a top level flow diagram of the processes performed using the MP system 100 will now be described. The flow diagram and this description introduce the process 320 a publisher 102 or information content provider (ICP) would use to design and distribute MPS titles.

As previously stated, a title is a publication, application, or service created using the MP system 100. A title consolidates the set of instructions for assembling the information that is displayed to the customer 160. Customers see titles as icons on the Microsoft Network, on CD-ROMs, or in a file system. By double-clicking (activating) on the title, name or icon, the customer can interact with the title.

Creating a Title

The MP system 100 is designed to support large teams creating complex on-line applications, as well as small teams creating individual works (and anywhere in between). This section, however, discusses only the more complex, high-end operations. In simpler scenarios, one person could perform more than one of the roles described below, and the amount of materials (stories, artwork, advertisements, and so on) would be more limited than the materials described here.

The process of creating and publishing a MPS title can be broken into a title-design phase and a release-creation phase. The process is set up so that all of the content and layout that is common across releases can be performed once in the preparatory design phase, and then left alone. This allows for a smaller team and faster turnaround in producing each release.

Title Design

The process of creating a new title begins with the editor. Assisted by business development staff, the editor decides on a target customer base, and on a concept for the title that will appeal to that base. This design team then develops that concept into a proposed organization for the contents of the title.

Before content can be put in place, a framework for the title must be created. This involves:

Creating a section hierarchy within the title.

Creating content folders to store stories, advertisements, and other pieces of content.

Creating search objects in each section of the title that draw content from the appropriate content folders using specified criteria.

In some organizations, this work will be done by the editorial staff. In others, it may be done by the production staff.

Once the basic framework is in place, the art department can create artwork to fill in the title's common elements. This includes:

A style sheet describing font usage and text layout.

Form layouts for sections that dynamically gather their content.

Form layouts for sections that are always the same (cover, title pages, mastheads, and so on)

Logos.

Optionally, organizations may want to include developers in the title design process. For example, the particular application being designed may benefit from the use of custom designed OLE Controls. These controls could be purchased, or developed in-house using the Microsoft Visual C++ development system. Additionally, the advanced features of the Blackbird system, including accessing the API or scripting controls to respond to events or automatically perform actions at runtime would require some development work, either in the high level scripting language (VBA), or in a lower-level language such as C++.

Authoring and Title Release

Once the framework is created, the staff can now turn their attention to creating individual releases. All of the work done in the conceptual phase above is potentially re-usable for every release. In fact, for a title with little need for detailed artwork, the rest of this process could merely be a matter of dropping edited content (including advertisements) into content folders.

For dynamic titles, most (and potentially all) of the work is done within the Content Authoring environment. For static titles, it could all be done within the Title Design environment. In practice, most releases will involve some work in both of these environments.

Writers Provide Tagged Content

Content authors—including editors, writers, reporters, and forum managers—generate content, including structured stories, using the content authoring environment. Writers compose the textual content that appears in a title (or a release of a title). They hand their materials off to the editorial staff. The editorial staff is in charge of the overall content of the title. For multimedia titles, this role is very similar to the director of a motion picture or television program.

The content authoring environment supports a variety of tools, such as, for example, a MPS document editor. The MP system 100 also supplies tools to specify and manage links and to specify story properties. Third-party tools may also be added to the content authoring environment.

From a content author's perspective, creating structured stories can be as simple as typing them in the MPS document editor and applying certain styles. More sophisticated content can be created though a variety of means, such as including links to graphics or placing special properties on a story.

For content providers that do not want to expend much effort creating tagged content, the MP system 100 includes MPS document editor templates that handle most of the tagging for the author.

Editorial Staff Chooses Content

Once the editorial staff has chosen the stories they wish to include in a release and are satisfied with the content of those stories, they pass them on to the art department to select and insert appropriate artwork, and to the production staff to place in content folders.

Art Department Supplies Specific Art

The artistic staff is responsible for designing the more graphical aspects of the title. In the early conceptual phase, graphic artists work with the editor to design a distinctive look and layout. This includes font styles, colors, titles, logos, and page layout templates. The term "art department" is used in the broadest sense here. In the multimedia world, the role of an art department goes beyond traditional print-based artwork.

The art department in many cases inserts the artwork into the stories and tags that artwork so that it will presented appropriately (placed inline in the story text, as a wrap, or as a pop-up). They then pass the stories on to the production staff to be placed in content folders. In the case of static titles, the art department designs new pages and gives them to the production staff to be placed in the title framework.

Advertising Department Supplies Copy

The advertising sales staff sells advertising space in each release. The advertising sales department collects copy from advertisers who have bought space in the release, and delivers the copy to the production staff to be placed in content folders.

Production Department Does "Paste-up", Proofing and Release

The production staff does the fundamental tasks, such as paste-up, necessary to put a title or release together. Once the production staff has everything that goes into the release, they "paste up" the release by placing everything in its appropriate place and performing a "test-pressing" to make sure that nothing is missing. The editors, art staff, production staff, and advertising staff review the test-pressing to make sure that everything looks and works correctly. Once everyone is satisfied, the production staff places everything on the publisher's server and releases it to be copied to additional servers at the Microsoft Network data center.

Top Level Flow

The process 320 begins at a start state 322 and continues at a state 324 wherein the publisher 102 uses the MPS project editor 184 (FIG. 2) to create a project on their workstation 180. A project, such as project C 286 (FIG. 4) contains all the information needed to build and distribute one or more titles and any associated content.

Moving to state 326, within the project, the publisher 102 creates titles and content folders, such as title 300 and content folder 302 (FIG. 4). A title consists of nested sections that contain MPS objects such as pages or search objects. Folders typically contain MPS content objects such as stories or pictures. To make the process of managing titles, folders, and MPS objects easy to understand and use, the preferred MPS 184 project editor (FIG. 2) looks and works like the Windows 95 Explorer.

Proceeding to state 328, the publisher 102 uses the MPS project editor 184, page editor 186 and style sheet editor 187 (FIG. 2) to create the MPS layout objects such as pages, styles, and search objects. The page editor 186 is also used to place controls (each control is a program responsible for handling a displayable region) on a page.

Moving to state 330, the publisher 102 creates content objects using Microsoft MPS Word 188, or the publisher can use third-party tools, such as the sound editor 190 or the image editor 192, that produce formats that the MP system 100 can interpret. The authoring and processing of content objects is further disclosed in a copending application also assigned to Microsoft Corporation, entitled "Structured Documents in a Publishing System", U.S. Ser. No. 08/503, 307, filed concurrently herewith.

Proceeding to state 332, the publisher 102 releases the project. In the presently preferred embodiment, releasing a project makes the titles, stories, and other MPS objects available on the Microsoft Network 122. The MP system 100 automatically connects to the network 122 and makes the titles in the project available to the customers 160, 162, and 164 (FIG. 1). Alternatively, the MP system 100 can release the title to CD-ROM 124 or other storage/communications media.

Continuing at state 334, the customer 160 uses the MPS Viewer 202 (FIG. 2) to read and page through (also termed navigation in an electronic publication) the released titles. As parts of the title are accessed, they are cached on the customer's computer 182 for fast access. The viewer 202 organizes and composes the objects it has collected and displays them to the customer 160.

Over time, the publisher 102 can update the project and the MP System automatically tracks the changes. Decision state 336 determines if the publisher desires to update the project. If the publisher does not wish to update the project, process 320 completes at end state 338. However, if decision state 336 is true, that is, the publisher desires to update the project, the process 320 moves to a decision state 340 to determine if the publisher 102 desires to modify the layout in the project. If so, the process 320 moves to state 342 wherein the publisher modifies one or more existing layout objects or adds one or more new layout objects. If the decision state 340 evaluates to be false, or at the completion of state 342, the process 320 moves to state 344 wherein the publisher modifies or adds one or more content objects. At the completion of state 344, process 320 proceeds to state 332 wherein the project is released again. Releasing the updated project ensures that the proper set of layout and content objects are made available to the customer 160 (FIGS. 1 and 2).

G. Exemplary Screen Display of Title

Referring now to FIG. 6, an exemplary screen display 360 of a page of a title as displayed by the Viewer 202 on the visual display at the customer workstation 182 (FIG. 2) will now be described. The screen display 360 corresponds to a World News section of a MSNLive title using a NewsFront page layout which has been named NewsFront by the designer. A tabbed horizontal bar 362 near the top of the screen 360 is handled by a caption button control showing the major sections of the title. By selecting a section name (by use of a pointer device like a mouse, not shown, but which is a part of or connected to the workstation 182), the customer 102 can navigate directly, through a link, to the selected section.

Below the bar 362 of screen 360 are two headlines 370 and 372 which are the result of an outline control that can be used as links to corresponding stories on another screen of the title. Block 373 in this example contains an advertisement resulting from a picture control. Block 374 contains a graphic and text resulting from a picture button control that provides a link to a weather screen. Areas 380 and 384 display headlines for corresponding abstracts 382 and 386, respectively, and are the result of an outline control. By selecting the headline 380 or 384, the customer can navigate to the body of the corresponding story on another page of the title. Areas 390 and 392 display picture objects corresponding to the headlines 380 and 384, respectively, and are the result of picture controls.

The objects and placement of the objects on the displayed page 360 are determined by the publisher 102. Of course, other objects or placements of objects could be utilized by the publisher 102.

H. Exemplary Screen Display of Project Editor Window

Referring now to FIG. 7, an exemplary screen display 400 of the parts of the content and layout for the example title displayed in FIG. 6 will be described. The Project Editor window 400 is the main interface for the Designer 194 (FIG. 2). The window 400 is intended to closely mimic the Microsoft Windows 95 Explorer. Using this window 400, the publisher can open, edit and save a project, as well as release the contents of that project to the MSN Data Center 242 (FIG. 3). An approximately left one-third of screen 400 is a display area 402, also known as a left pane, that shows the hierarchy of containers of one project for a publisher and allows the user to navigate through it. The left pane shows only containers (folders, titles, and sections). An approximately right two-thirds of the window 400 is a right pane 404 that shows the contents of a container selected in the area 402 by the user of the project editor 184 (FIG. 2).

Referring to the left pane 402 of the window 400, the top level of the hierarchy of containers is the project "MSNLive" 406. Just below the project is the title "MSNLive" 408, which in this example has the same name as the project 406. In another example, the project could have multiple titles, such as January and February issues of a magazine. Below the title in the example hierarchy are two sections: "News" 410 and "Sports" 414. Also at this level in the hierarchy is a content folder 418 labelled "Graphics", which holds the picture objects used by the project 406. Below the sections 410 and 414 is a set of subsections 412 for the "News" section 410 and a set of subsections 416 for the "Sports" section 414. The "News" section container 410 has been selected by the user, which is evidenced by the highlighting of the section label "News" and the opened section icon to the immediate left of the "News" label.

Referring to the right pane 404, the layout objects and content objects directly contained within the selected container in the left pane 402 are shown, e.g., the objects of the "News" section container are displayed in this example. The left pane 404 uses standard Explorer views, as well as a special view built for the window 400, which sorts according to a user-defined order and allows the user to change the order by dragging and dropping each objects' icon. The objects are preferably grouped by type of object, such as, for example, subsection objects 412, page layouts 420 and content objects 422. The order of the pages and content objects is significant. The title maintains a sequence ordering of the sections, pages, and search objects, as this is important in determining how the title is displayed. Within a section, the pages have a sequence that determines the order in which they are used to press content and the order in which they are displayed when the user browses sequentially. In a static section, pages are displayed in the order shown in the project editor window 400.

A dynamic section uses the dynamic story control (FIG. 8) to display stories within a section. The stories are sorted according to rules specified on the section's property sheet and then are concatenated or linked together. The stories are then filled into the dynamic story controls on each page in the section, in the order in which the pages are arranged in the section. If there are more stories than there are pages, the last page is re-used repeatedly until all content has been pressed. For instance, in FIG. 7, the Backpage in pages 420 would be reused.

Toolbar buttons and corresponding menu commands allow the Publisher to quickly add new objects to the titles and folders within the project 406. Clicking a button will add a corresponding object to the container selected in the left pane 402. Only those objects that are allowed to be in the selected container have their corresponding toolbar buttons and menu items enabled.

I. Example of Rendering Process

Figure 8:
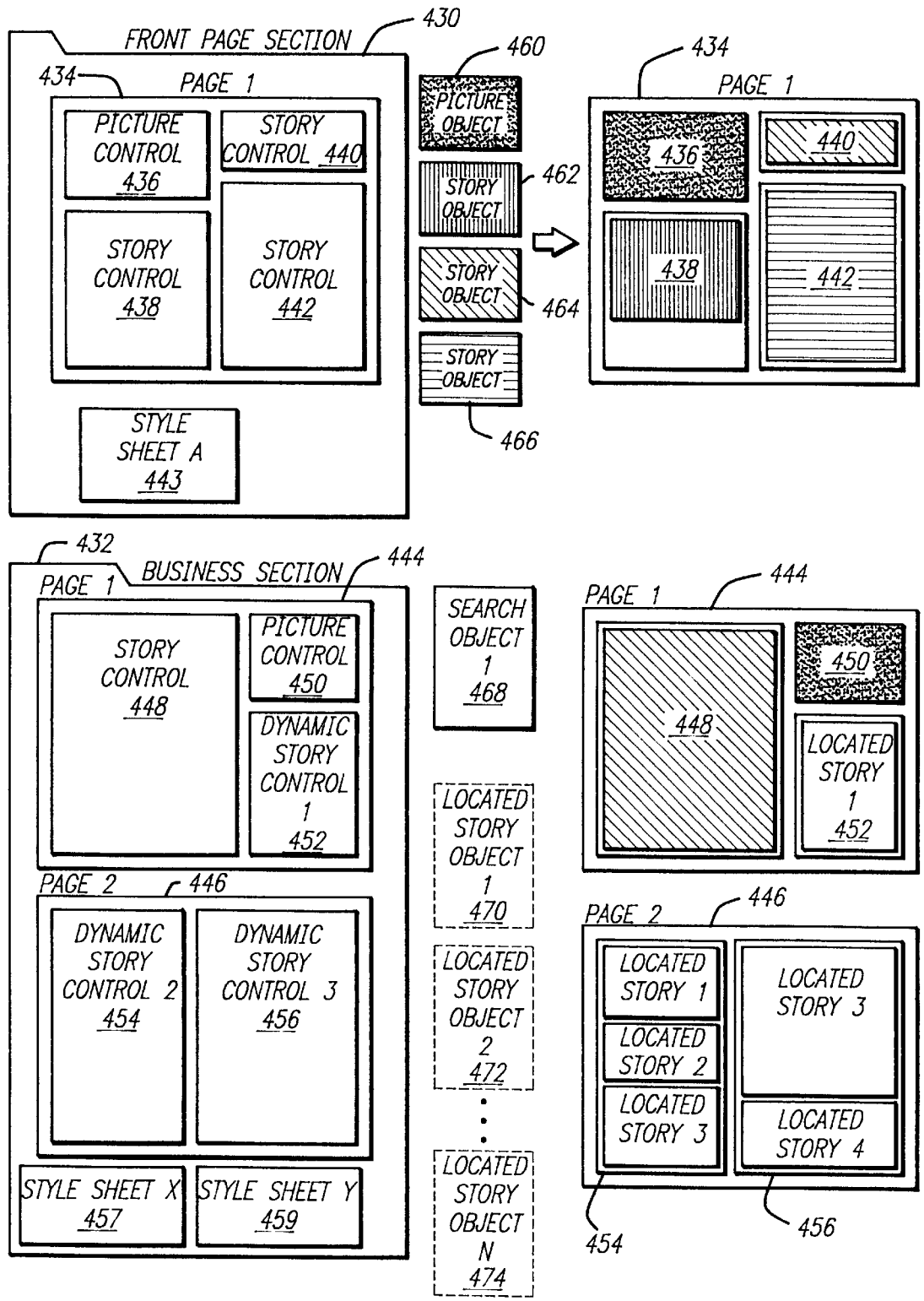
FIG. 8 is a block diagram of the interaction of page layouts, controls, style sheet and content objects at the viewer of FIG. 2.

Referring now to FIG. 8, the interaction of page layouts, having controls, and objects at the Viewer 202 (FIG. 2) of the customer's workstation 182 to render pages will now be described.

FIG. 8 presents a diagram of front page section 430 and a business section 432 for a title, such as a newspaper.

1. The Front Page Section

The front page section 430 contains a page 434 which has a picture control 436, and a set of static story controls: a first story control 438, a second story control 440, and a third story control 442. Each static story control or picture control is linked at publication time to just one object. Each of the controls on the page 434 references a style sheet 443 to provide formatting instructions on how the content is to be displayed.

As shown in FIG. 8, a picture object 460 is linked to the picture control 436, so that upon rendering, the picture object 460 is displayed on the page 434 at a position determined by the control 436. Similarly, a story object 462 is linked to the static story control 438 and rendered into the position of the control 438 on the page 434.

Note that since the control 438 is a static story control, any area not used by the story object 462 in the area identified by the control will be blank. As shown, a story object 464 is linked to the story control 440 so that it is rendered in the area identified by the static story control 440 on the page 434. In this example, for instance, only the first paragraph of the story object 464 will be rendered on the page 434 due to the size of the control 440 (as selected by the designer). In this manner, the designer can choose to only display a portion of a linked story within a static story control by adjusting or sizing the control to only hold one paragraph, or other desired portion, of the story content. Normally, a static story control will allow scrolling of a story so that ultimately the entire story will be displayed.

Finally, a story object 466 is linked to the story control 442 so that it is rendered in the area identified by the static story control 442 on page 434. In this example, the entire story object 466 is rendered onto page 434.

It is important to note that each of these story objects makes reference to the style sheet 443 before being rendered on the page 434. When story objects are authored, they are given formatting tags that represent specific styles. As the story objects are rendered, they reference the style sheet that is linked to the appropriate control to retrieve formatting information. This formatting information includes properties of the paragraphs, fonts and embedded objects in the story that format the content as it was originally designed. Due to the separation of design and content in the MP system, the story objects themselves only have formatting tags, but do not contain a description of the particular format that corresponds to each tag. The descriptions of those tags is found in the style sheet that is linked to the control into which the story object becomes rendered. This process will be explained in more detail below with respect to FIGS. 9–15.

2. The Business Section

As also shown in FIG. 8, the business section 432 contains a first page 444 and a second page 446. The page 444 has a single static story control 448, a single picture control 450, and a first dynamic story control 452. The second page 446 has two dynamic story controls, 454 and 456. In addition, a style sheet X 457 and a style sheet Y 459 are referenced by the different controls on pages 444 and 446. The pages in the business section 432 differ from the page 434 in the front page section 430 because they rely on a search object 468 to retrieve particular stories. On the page 434, the static controls were each linked to a particular story which was then displayed upon rendering. The search object 468 is affiliated with the dynamic story controls in the section 432.

As shown in this example, the static story control 448 and the picture control 450 on the page 444 reference or link to the story object 464 and the picture object 460, respectively, and display these objects as shown on the rendered page 444. The story object 464 is thereby shared between different sections, pages and controls in the title. The entire story object 464 is displayed on the page 444, whereas only the first paragraph was displayed on the page 434. By using a similar process, a designer can choose to display just the first paragraph of a story on the first page of a title, but include the entire story on another page within the same title. As shown in FIG. 8, the picture object 460 is also shared between the control 436 and the control 450. This sharing of content between separate sections and pages is an important feature of the MP system 100.

3. Dynamic Story Controls

The dynamic story control 452 uses the results of a query performed by the title to retrieve stories matching search criteria set by the publisher (as defined by the search object 468). The search object 468 locates story objects having specific properties. In the example of FIG. 8, the search object 468 returned many story objects 470, 472 and 474 corresponding to story objects 1 through N, respectively (where N=4 in this example). All of the retrieved story objects are concatenated together by the dynamic story controls and poured into the appropriate regions on the pages. The order that the stories become rendered into the control regions starts with the first dynamic story control on the page in the section and continues to other dynamic story controls contained within the section.

If enough pages to display all the located stories are not defined in the section, the last page used is repeated until all stories are rendered. Thus, the first located story 470 is poured into the area defined by the dynamic story control 452. Since it does not completely fit in that area, the located story 470 continues across the page boundary onto page 446 into the area defined by the dynamic story control 454. The located story object 472 then begins after the located story object 1 470 ends. The next located story object (located story object 3) begins after the story object 472 ends, continuing into the next control 456 on page 446, as shown in this example. The last located story object 474 retrieved by the search object 468 in this example is then rendered into the dynamic story control 456 within page 446.

As explained above, the dynamic story controls in the section 432 use the search object 468 to display the results of queries made for specific information. For example, the search object 468 may return content that contains the word "Microsoft". Each of the stories found by the search object 468 will be displayed in the areas defined by the dynamic story controls in the format designated by the style sheet 457 or the style sheet 459.

For example, if the dynamic story control 454 is linked to the style sheet 457, then all of the stories displayed by the dynamic story control 454 will appear in the format designated by the style sheet 457. However, the stories rendered by the dynamic story control 456, when this story control is linked to a different style sheet (for example, the style sheet 459), would appear differently than the formatted display corresponding to the dynamic story control 454. In this example, if the controls 454 and 456 use different style sheets, the located story 3 would be displayed using two formats when the transition from the area defined by the control 454 to the control 456 was made.

IV. Style Sheet Overview

Style sheets and the style objects they collect are created by the designer (i.e., the person at the publisher workstation 180 shown in FIG. 2) using the Project Editor and the Style Sheet Editor. Once the style sheet has been created, it is stored in the cached object store (COS) along with the other objects in the project as described above in reference to FIG. 2. The style sheet objects support OLE serialization and are therefore based on the Microsoft Foundation Class (MFC) CObject class. These class definitions are publicly available from the assignee.

As described at the beginning of the detailed description section, a different style sheet may be linked to each control region on a page. However, in all likelihood, style sheets will be shared among more than one control. As is known in the present software technology, a globally unique identifier (GUID) can be used in OLE object-oriented environments to identify an object with a unique string of characters. Normally, unique GUIDs are produced by concatenating the time, date and network card serial number of the computer at the time that the object is created. By using this method, it is virtually impossible for two objects to receive the same GUID. In the MP system, each control keeps a record of a GUID associated with its linked style sheet. This is how a particular control can reference its associated style sheet. More than one control can refer to the same GUID, and therefore share style sheets. When a control needs access to its associated style sheet, the control requests the style sheet from the title. If the style sheet has not already been loaded into volatile memory, the title object handles loading it from the COS.

In practice, the designer uses the project editor 184 (FIG. 2) to insert/create a new style sheet in the title. Initially, the style sheet is empty and therefore uses the style definitions in a default style sheet. However, the designer can choose to invoke the style sheet editor 187 (FIG. 2) to define properties for style objects in the style sheet and change existing style object property values. The set of styles supported by style sheets is predetermined so that control regions won't run across a new style that hasn't been defined. The designer cannot create new styles but can only modify the default property values for existing styles. By way of example, the style "Normal" could have its FONT NAME property set to "Dutch Roman" and override the default "Normal" style font name. But if the style "Normal" did not exist it could not be created by the designer.

When invoked, the style sheet editor 187 displays a series of dialog windows listing the predefined style names and fields for editing their property values. This process will be explained in more detail in the following sections. These style object property values are retrieved from the default style sheet created by the title. Initially these fields contain the default values defined in the default style sheet. The designer selects the name of the style to customize and sets the desired new property values. When the properties are set as desired, the style sheet editor 187 creates a new style object within the style sheet having the new property values. The new style object now serves to override the default style sheet properties.

The set of properties defined by a style object is exactly that set of text formatting properties supported by the MPS text based controls (PSF, Text Based Infomaps, Rich Text Format). These properties are defined in detail below and are presently divided into three basic classes: character properties, paragraph properties and wrap properties. However, formatting properties for audio, animation images and video may be added as the MP system is designed to be extensible.

Character properties identify the font attributes to use when rendering text (face name, point size, bold, italic, colors, etc.). Both character and paragraph style objects within a style sheet support character properties. Wrap style objects only support wrap properties.

Styles which support only character formatting properties are referred to as character styles while those that support both character and paragraph formatting properties are called paragraph styles. Styles supporting wrap properties are known as wrap styles.

Each paragraph of output text has a single character style that the first style is based upon. In addition, some or all of the text in a given paragraph may have a character style applied as well. Character styles are additive meaning their properties are applied in addition to the properties of the underlying paragraph style. Note however, that a character style need not have a value defined for every available character property. Thus, only those properties which have been assigned a value for the character style are applied. Character formatting properties not defined by the character style are picked up from the character properties of the underlying paragraph style.

As described above, style objects are defined using the style sheet editor and stored in a style sheet which resides in the COS. Style objects are serialized to their appropriate style sheet through the MFC serialization protocol defined by the MFC class CObject. The structure of the style sheet object and its association with style objects is discussed below.

V. Style Sheet Object Structure

Figure 9:
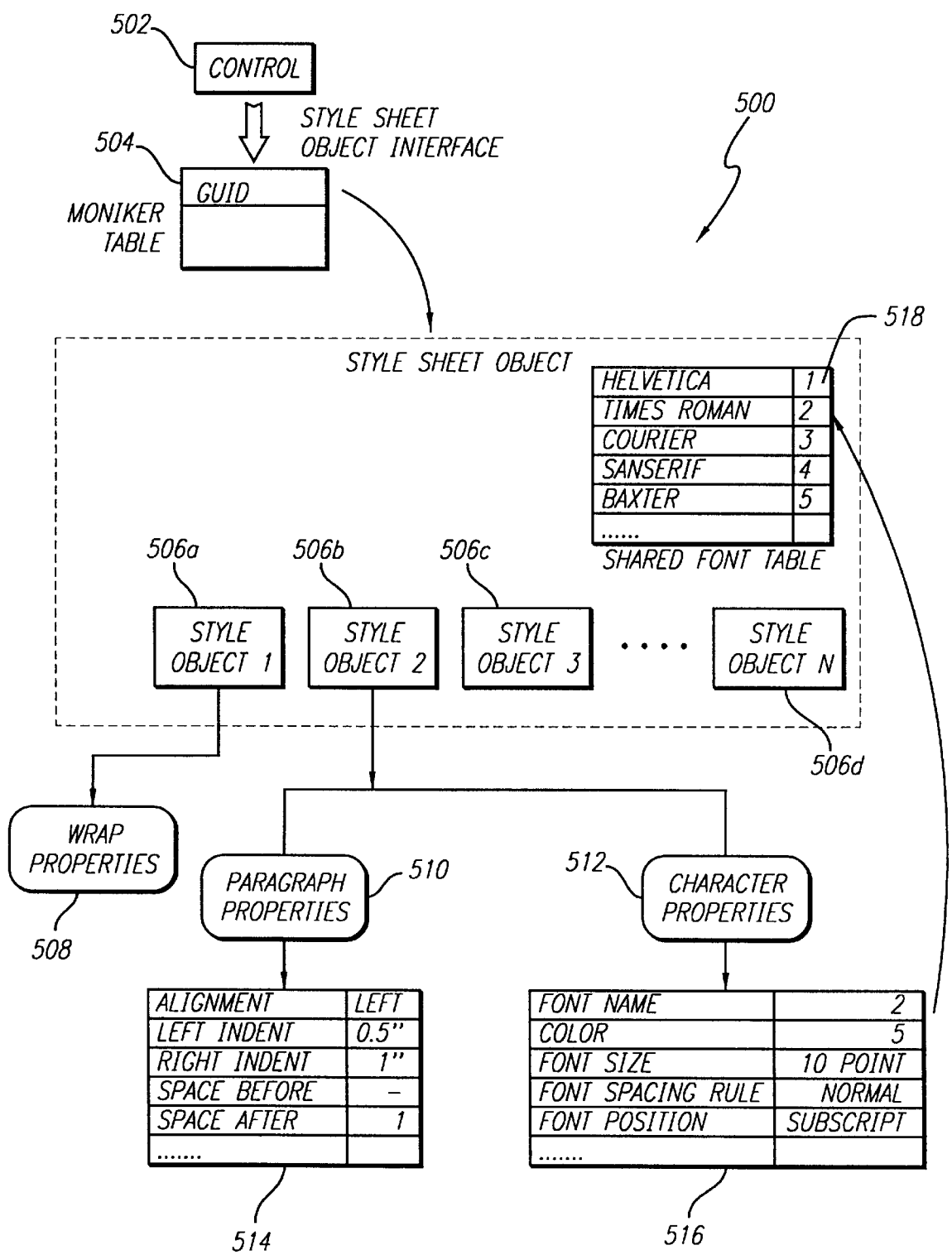
FIG. 9 is a diagram illustrating the internal structure of a style sheet object such as shown in FIG. 8.

FIG. 9 shows an overview of the structural features of a style sheet object 500. As has been explained above, a control 502 references a style sheet object 500 through an OLE style sheet object communication interface. The MP system 100 uses a newly designed OLE interface called IStyleSheet to handle communications between the control 502 and a COS moniker table 504. The Control 502 is associated with a particular style sheet object 500 by maintaining a reference to the associated style sheet's GUID. When the control 502 needs to retrieve a particular style from the style sheet object it uses the IStyleSheet interface to request property values of the chosen style. A more complete description of moniker tables and their use in an OLE environment can be found in *Inside OLE* 2 by Kraig Brockschmidt (Microsoft Press).

As shown in FIG. 9, the style sheet object 500 typically references numerous different style objects 506a, 506b, 506c, and 506d. Conceptually, the style sheet object 500 can be thought of as a container for any number N style objects 506a–d. Presently there are three types of style objects contained within each style sheet object 500. The three possible types of style objects are paragraph styles, character styles and wrap styles. The first two types of style objects are applied to text regions of a document while the third (wrap) style is applied to an embedded picture object. As can be appreciated, other types of styles could be included within the style sheet without departing from the nature of this invention.

A paragraph style object is applied by an author to a particular paragraph of text to define its properties. For example, the author may decide to use a Heading1 paragraph style to format a story's title. By selecting the title of the story with a mouse and then choosing "Heading1" from the style window in MP Word, the title is designated to have a Heading1 style. When this story is rendered on the viewer, the attached style sheet will be referenced to find the correct display format for a Heading1 style. It may be, for example, centered text, all caps, with 2 lines following the last line of the title. Examples of various paragraph style objects are shown in Table 1 below.

TABLE 1

Paragraph Style Objects

| Style Object | Description |
|---|---|
| Heading 1 | First Heading Style |
| Heading 2 | Second Heading Style |
| Heading 3 | Third Heading Style |
| Heading 4 | Fourth Heading Style |
| Heading 5 | Fifth Heading Style |
| Heading 6 | Sixth Heading Style |
| Normal | A Standard Paragraph |
| Glossary | A list of terms and definitions |
| List •1 | A first bulleted list style |
| List •2 | A second bulleted list style |
| List •3 | A third bulleted list style |
| List •4 | A fourth bulleted list style |
| List •5 | A fifth bulleted list style |
| List #1 | A first numbered list style |
| List #2 | A second numbered list style |
| List #3 | A third numbered list style |
| List #4 | A fourth numbered list style |
| List #5 | A fifth numbered list style |
| Preformatted | Preformatted text |
| Quotation | A quote from another source |
| Address | An address |
| Abstract Heading | An abstract |
| TOC1 | A table of contents entry |

The designer may choose one of these paragraph styles for each paragraph of content material. When a customer renders a particular title in the viewer, each of the paragraphs of content are displayed by reference to the chosen style sheet. Thus, a paragraph marked as having an "Abstract Heading" style will be formatted with the properties held in the "Abstract Heading" style object in the linked style sheet.

While paragraph style objects control the display format of an entire paragraph, character style objects control the display format of individual characters and words. Some well-known examples of character styles are bold, italics, and underlined. A more complete description of character styles is shown below in Table 2.

TABLE 2

Character Style Objects

| Character Object | Description |
|---|---|
| Bold | Bold text |
| Italic | Italic text |
| Underline | Underlined text |
| Strikethru | Strike-through text |
| Fixed width | Fixed width font |
| Emphasis | Emphasized text (usually italic) |
| Strong | Strong text (usually bold) |
| Code | an example of code (usually fixed width font) |
| User Action | Indicates something a user does or types |
| Citation | A citation (typically italic) |
| Variable Name | A variable name in code |
| Term | A term (usually followed by a definition) |
| Definition | A defining term (typically bold or bold italic) |
| Hyperlink | A link to another object |

The third type of style object is a wrap style object which determines the position of a graphic image within a control. Presently there are nine possible wrap values corresponding to the four corners of the control, the four sides of the control, and the center of the control. These positions will be discussed in more detail in reference to FIG. 15. As is shown in FIG. 9, the wrap style object 506a differs from the paragraph style object 506b.

The wrap style object 506a has a single stream of data 508 corresponding to the position of a graphic image, and does not contain paragraph properties 510, or character properties 512. Wrap styles are used to indicate to a control where a graphic image should be placed within the control. For example, a publisher might want an advertisement for his magazine to appear at the top, right side of a control. By selecting a wrap style that indicates this position in the control, a graphic image that is part of the tagged content will be rendered in the top, right corner. A more detailed description of the wrap properties will be discussed hereinbelow in reference to FIG. 15.

As can be seen upon reference to FIG. 9, style object 506b has an associated paragraph properties stream 510 and character properties stream 512. The paragraph properties stream 510 includes data corresponding to paragraph positions for the particular paragraph styles among other paragraph related properties. For example, the paragraph style object 506b may contain paragraph properties of left-alignment, a ½" first line indentation, and one space after each paragraph. This data is shown as a table in a paragraph properties stream 514. A complete list of presently defined paragraph properties is shown below in Table 3. While these are preferred paragraph properties, other similar properties could also be included in the paragraph style object.

TABLE 3

Paragraph Properties

| Property Name | Property Description |
|---|---|
| Alignment | Position of paragraph (left, center, right, justified) |
| Left indent | Position of paragraph in relation to left margin |
| Right indent | Position of paragraph in relation to right margin |
| Special | Position of first line of text relative to left indent (first, hanging, none) |
| Spacing | Amount of space between lines in a paragraph |
| Space before | Amount of space preceding beginning a paragraph |
| Space after | Amount of line space following end of paragraph |
| Initial | The type of bulleting or numbering to insert before beginning of paragraph (big, drop) |
| Rules | Type and size of borders above, below, at right and at left of the paragraph |
| Tabs | Position of tab stops within paragraph (left, right, outer, right, decimal) |
| Drop caps | Whether first character in paragraph should be treated as a drop cap |

The paragraph properties table 514 includes data corresponding to each of the paragraph styles shown in Table 1. When style object 506b is chosen to represent a particular paragraph, each of the values held in a paragraph properties table 514 are applied to that particular paragraph.

In a similar way, style object 506b also includes a character properties stream 512 that has an associated character properties table 516. The character properties table 516 maintains values corresponding to all of the character properties for style object 506b. A list of the possible character properties is shown below in Table 4. Although some of the character properties are shown below, this is not intended to encompass the entire list of possible properties. Other character properties could be added to the list without departing from the true nature of the invention.

TABLE 4

Character Properties

| Property Name | Property Description |
| --- | --- |
| Name | Unique name for the style |
| style sheet | Style sheet that owns the style object |
| Based on | Another style which this style is based upon |
| Character style | Indicates that this style object is a character style and contains no paragraph style properties |
| Font name | Face name of the font (Arial, Times Roman, Courier, etc..) |
| Font size | Size of font in points |
| Font effects | The font effects (bold, italic, underline, strike-through) |
| Font position | Position of characters relative to the baseline (normal, superscript, subscript) |
| Font Foreground Color | RGB color value for foreground |
| Font Background Color | RGB color value for background |

Although the character properties table 516 contains values pertaining to the character properties associated with the style object 506b, some of the actual values are stored in a shared font table 518 that is associated with the style sheet object 500.

In the MPS system, the character properties table 516 does not actually maintain a list of all possible font names. Instead, to increase the system's performance and reduce memory requirements, the character properties table 516 contains ID pointers corresponding to the font name which then reference a shared table such as a font table 518. The shared font table 518 is a data array which holds font names, along with their corresponding ID numbers. In this manner, the character properties table 516 only needs to hold a small ID number in place of a style name. The ID number references back to the shared font table 518 to retrieve the actual font name for that style object.

As an example, the font name property 519 of style object 506b has a pointer set to the number 2 in the shared font table 518. It can be seen that table location 2 corresponds to the Times Roman font, therefore the font associated with style object 506b is a Times Roman font. By using the shared font table 518, the style object 506b only needed to hold a small reference ID number and not the entire name of the associated font. Of course, the present invention is designed to be flexible and allow for other style object properties to be shared, if necessary.

VI. Applying Style Sheets to Content

Figure 10:
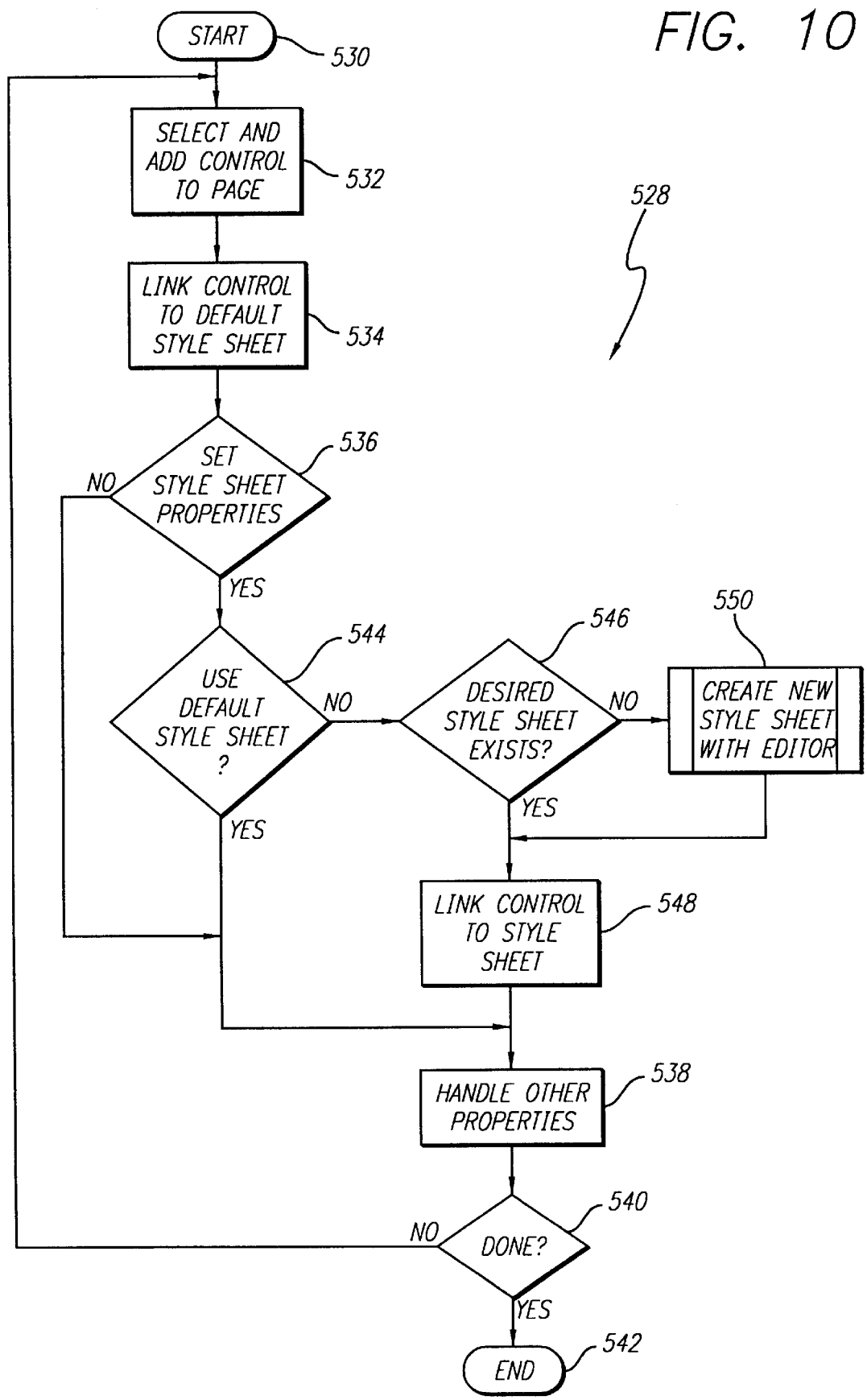
FIG. 10 is a flow diagram of the process used to add style sheets to a control region of a page which is a process in the flow diagram shown in FIG. 5.

While FIG. 9 details the structure of a style sheet object, FIG. 10 is a flow diagram showing a process 528 that a publisher (e.g. publisher 102, FIGS. 1, 2 and 3) undertakes to link a style sheet to a control region. As discussed above in reference to FIG. 5, a publisher first creates a project in the MP system designer program. Once the project has been created, a title is created within the project. The title is responsible for managing the sections and pages of the project. After a title is created, sections are defined within the title. These sections can be thought of as being similar to sections of a newspaper. Within each of these sections, the designer creates a series of pages. Each page can have one or more control regions for displaying the actual content to be shown to the customer.

FIG. 10 provides a more detailed view of one aspect of the "Publisher Creates Layout Objects" process 328 and the "Publisher Modifies or Adds Layout Objects" process 342 discussed above in reference to FIG. 5. For further reference, the Project Editor allows access to the Page Editor where the control properties are set (FIG. 2).

In FIG. 10, the process is initialized at a start state 530 once a page has been created by the publisher of a particular title. After creating a new page within the title, the publisher decides at a state 532 which control to select and add to the page. Many types of controls can be added to a page, including static story controls, dynamic story controls, outline controls, caption controls, picture controls, shortcut controls and audio controls. However, other controls can be defined as the MP system is designed to be extensible.

At state 532, the publisher decides which type of control to select and add to the page. Once the appropriate control has been selected and added to the page at state 532, the control automatically uses the IStyleSheet OLE communication protocol to link with the default style sheet at a state 534. In the preferred embodiment of this invention, the control links with the default style sheet by referencing a null GUID (for instance, the number zero) in place of a particular GUID for a specific style sheet when it is created. In this way, if not other action is taken, a new control is always linked to the default style sheet by virtue of the fact that there is a null GUID defining the appropriate style sheet to use for the new control.

Once the control becomes linked to the default style sheet at a state 534, a decision is made at a decision state 536 whether to set style sheet properties for the selected control. If a decision is made to not set any style sheet properties, the process 528 passes to an additional state 538 wherein other properties of the control are handled. These other properties can be related to the position and size of the control on the page, or other similar properties of the control. Once other properties of the control are handled at state 538, a decision is made at a decision state 540 whether or not the process 528 is done. If the designer is through setting properties for the control, and has no other controls to create, the process 528 passes to an end state 542 and the system completes. If the process 528 is not done at decision state 540, the process 528 loops back up to state 532 wherein an additional control can be added to the page.

If the designer decides at the decision state 536 to set style sheet properties for the particular control, then a second decision is made at a state 544 whether or not to use the default style sheet that is automatically produced when the page is created. If the designer decides to use the default style sheet at the state 544, then any other properties are handled at a state 538. Any other properties of the control that must be handled are set at the state 538. If all of the controls have been placed on the page, and all of the properties have been handled then the process 528 ends at the end state 542. If more controls need to be added to the page, then a decision is made at the decision state 540 to continue and the process 528 loops back to the step 532 wherein controls are selected and added to a page.

As can also be seen in FIG. 10, if the designer makes a choice at decision state 544 to not use the default style sheet, then a further choice is made at a decision state 546 whether or not the desired style sheet exists. If the desired style sheet exists, then the selected control is linked to the desired style sheet at a state 548 and the system continues to thereafter handle other properties at state 538. The mechanism for linking the selected control to the desired style sheet at the state 548 follows standard MFC serialization protocols well known in the structured storage system of OLE object management. Briefly, the control is passed a reference to the GUID of the desired style sheet so that it no longer references a null GUID. Further information on OLE serialization protocols and structured storage systems can be found in *Inside OLE* 2 by Kraig Brockschmidt (Microsoft Press).

If the desired style sheet does not exist at state 546, then a new style sheet can be created by the designer with the style sheet editor at a process 550. It will be understood that although the style sheet editor is preferably invoked from the project editor rather than the page editor, this diagram is functionally equivalent to the preferred implementation.

Figure 11:
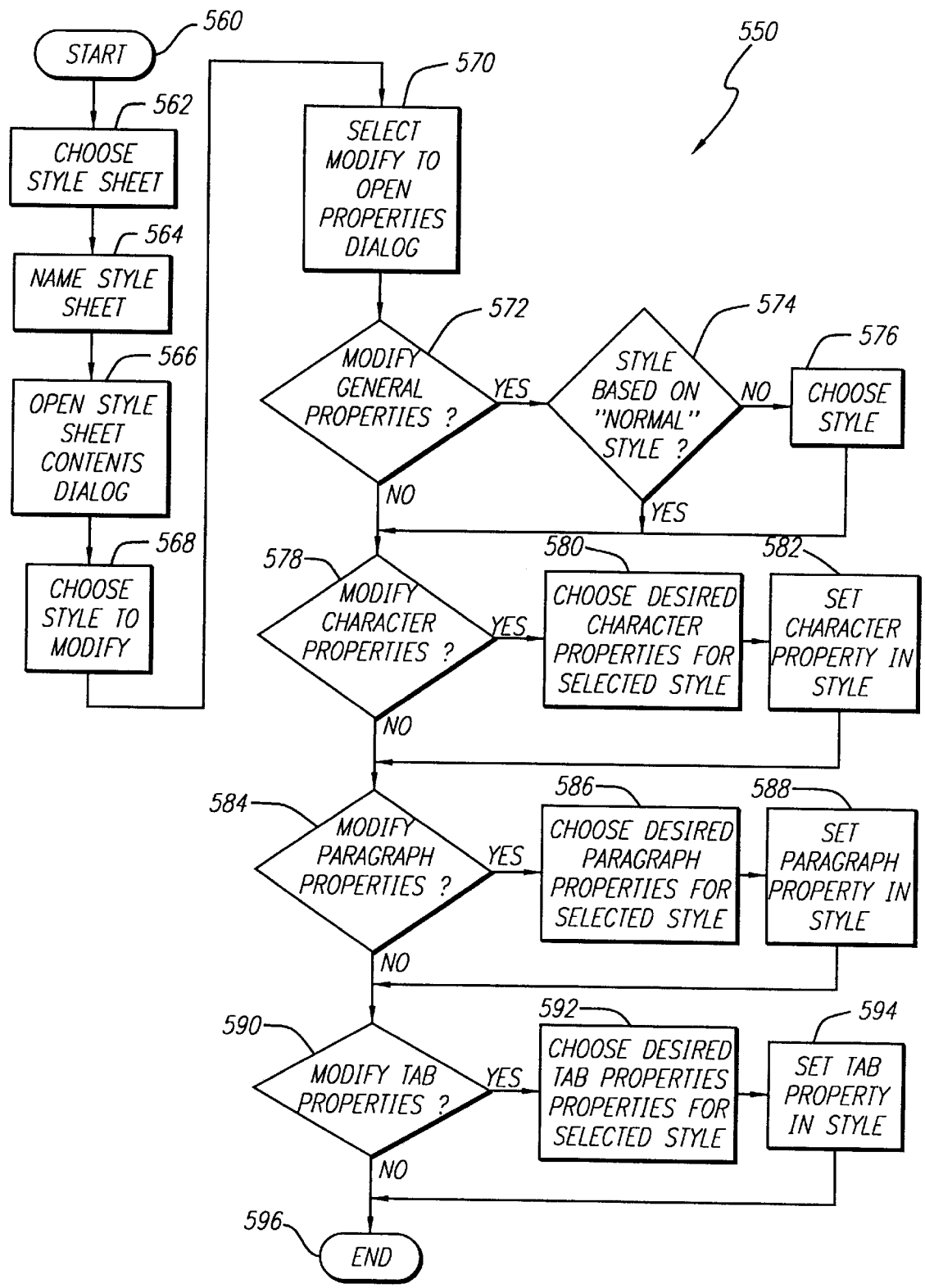
FIG. 11 is a flow diagram of the process used to create new style sheets with an editor as illustrated in FIG. 10.

The process 550 of creating a new style sheet with the style sheet editor is explained in more detail now upon reference to FIG. 11. Once a new style sheet has been created with the style sheet editor at state 550, the new style sheet is linked to the control at state 548 by standard protocols explained above. If more properties need to be addressed, they are handled at state 538. If no other controls need to be added to the page at decision state 540, then the process 528 ends at state 542. If more controls need to be added, then the process 528 loops back up to selecting and adding controls to pages at state 532.

A. Creating New Style Sheets With The Editor

FIG. 11 shows a more detailed view of the process 550 for creating new style sheets with the style sheet editor as illustrated by process 550 of FIG. 10. The process 550 begins at a start state 560 after the designer makes a choice to begin creating a new style sheet. A new style sheet is chosen at a state 562 by selecting the new style sheet button from a menu bar in the project editor. Once a new style sheet has been chosen at state 562, it appears as a new item in the title tree for the selected project. By moving a mouse to the newly created default style sheet and selecting the icon representing the new style sheet, its name can be changed as indicated in state 564. Once the style sheet has been named at state 564, double-clicking with a mouse on the newly created style sheet icon will open that style sheet's content dialog as shown at step 566. The style sheet content dialog displays a list of all style objects which can be modified in the new style sheet. The user then chooses which style to modify at state 568 in the style sheet.

Once a style has been chosen at state 568, the user can either double-click on the chosen style or press the "modify" command to open the style properties dialog as shown in a state 570. The style object properties dialog is the interface which saves style properties to the style objects. As shown in FIG. 11, there are four types of properties which can be modified. The tab properties are stored within the paragraph object, while the general properties are held in both character and paragraph objects. Once the properties dialog has been opened at a state 570, the publisher can modify the general properties at a decision state 572. If a decision is made to modify the general properties, then the publisher decides whether the style is based on a "normal" style at decision state 574. If the style is not based on a "normal" style at decision state 574, then a style can be chosen at a state 576.

However, if the style is based on a "normal" style at the decision state 574 then the process 550 passes on to the next decision whether or not to modify character properties at a decision state 578. If the publisher originally decides at the state 572 to not modify the general properties then the process 550 passes directly to a decision whether or not to modify the character properties at a decision state 578.

If a decision is made at the decision state 578 to modify the character properties, then the publisher chooses the desired character properties for the selected style at a state 580 and thereafter sets the character properties of the style at a state 582. If a decision is made to not modify the character properties, then the process 550 passes directly to the next decision of whether or not to modify the paragraph properties at a decision state 584.

Similarly, once the character properties have been set for a style at the state 582, the process 550 passes to the decision whether or not to modify the paragraph properties at a decision state 584. If a decision is made to modify the paragraph properties at state 584, then the desired paragraph properties are chosen for the selected style at state 586 and the paragraph properties are set in the style at state 588.

Once the paragraph properties have been set at state 588, the system moves to the next decision of whether or not to modify the tab properties at a decision state 590. If the decision was originally made to not modify the paragraph properties at state 584, then the process 550 passes directly to the decision of whether or not to modify tab properties at a decision state 590.

If a decision is made to modify the tab properties at decision state 590, then the desired tab properties are chosen for the selected style at a state 592, and those properties are set in the style at a state 594. Once the tab properties have been set in a style at the state 594, the process 550 moves to an end state 596. If however, the decision was made to not modify the tab properties at decision state 590, then the process 550 moves immediately to an end state 596.

This overall scheme shows the process 550 of creating a new style sheet (e.g., FIG. 10) and defining style objects (e.g., FIGS. 9 and 10) within the style sheet. As discussed above, once a style sheet has been created, it can be associated with a control through the control properties dialog discussed above. When the viewer instantiates a selected page, the style objects defined for each control are used to format the display to the user. The process that the viewer undertakes to instantiate content into a control having an associated style sheet is discussed below.

B. Viewing a Tagged Document

Figure 12A:
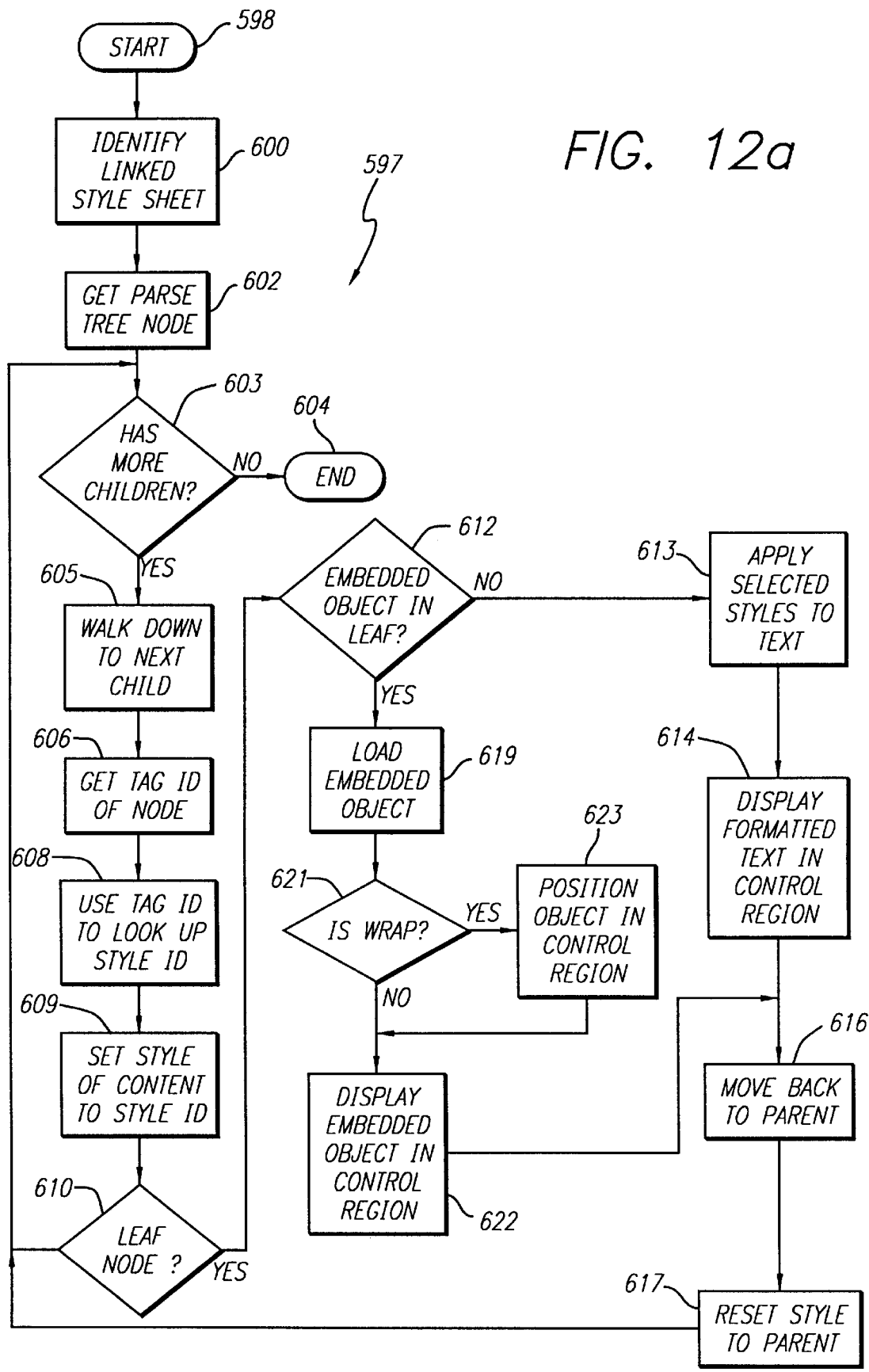
FIG. 12a is a flow diagram of the process performed by the viewer as shown in FIGS. 2 and 5 to gather style information from tagged content and format the content based on a style sheet.

Referring now to FIG. 12a, a process 597 for reading a parse tree and formatting the parsed content into a control region is shown. The process 597 begins at a start state 598 after a customer 160 opens a page and a control begins executing its commands. In the control, a linked style sheet is identified at a state 600. Each control on every page in the MP system references a style sheet GUID which directs the control to its associated style sheet using the IStyleSheet OLE interface. After finding the associated style sheet, the control requests a MPML parse tree corresponding to the content to be rendered from the viewer (state 602).

Figure 12B:
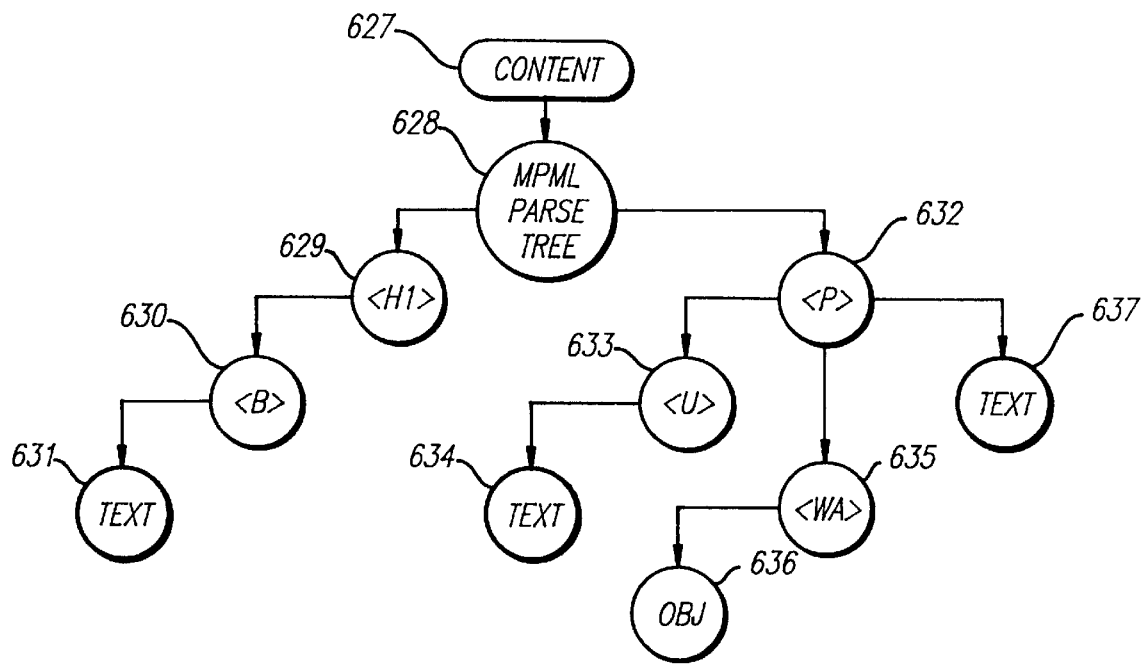
FIG. 12b is a diagram illustrating an exemplary Multimedia Publishing Markup Language (MPML) parse tree.

Once the control has requested the first node of the MPML parse tree of the content at the state 602, the process 597 moves to inquire whether or not there are child nodes hanging off the parse tree node at a decision state 603. If no child nodes are found off the parse tree node returned in state 602, the process 597 ends at an end state 604. However, if there are children of the parse tree node at decision state 603 then the process walks to the next child at a state 605. A schematic view of a MPML parse tree and its associated nodes is shown in FIG. 12b.

Once the process 597 has moved down to the next child in the tree at state 605, the tag ID number of the node is requested at state 606. A tag ID number is generated when the content (normally a MDF file) is linked to a control by the designer. Each tag, for example, <H1>, is converted to a numerical description during the process of linking to a control to save space in the stored, parsed content. Therefore, at the state 606, the tag ID of the node is a number corresponding to a particular tag.

Once the tag ID number for the current node has been retrieved, the process 597 retrieves a style ID number from a tag ID lookup table stored in the VIEWDLL.DLL at a state 608. A style ID number is a number which is associated with a particular style object. For example, style ID number 6 may correspond to the HEADING 1 paragraph style object in the linked style sheet. Once a style ID number for the current node has been ascertained, a pointer is set at a state 609 so that any text or embedded object residing below the current node on the parse tree will be formatted with the retrieved style.

Once a pointer has been set to the current style ID number at state 609, the decision is made at decision state 610 whether the current node is a leaf node or not. A leaf node is the lowest node on a branch of the parse tree. As can be seen with reference to FIG. 12b, the leaf nodes contain either text or embedded objects. The text or embedded objects in the leaf nodes are formatted into the control region in the styles that are set by the leaf node's parental nodes. Thus, if a particular text leaf node in the parse tree is below a tag corresponding to a bold character style, the text in that leaf node will appear as bolded in the control region.

If the current node is not a leaf node at decision state 610 the process 597 loops up to question whether more children of the node exist at a decision state 612. If the current node is a leaf node at decision state 612, the process 597 queries whether the current leaf node contains an embedded object. Preferably, the embedded object is an OLE object, however other embedded objects known in the art are within the scope of the present invention.

If the leaf node does not contain an embedded object at decision state 612, then the styles that have been set at state 609 are applied to the current text at a state 613. After the selected styles have been applied to the text at state 613, the formatted text is then inserted into the control region and displayed by the control at a state 614. It should be observed that an assumption is made that text objects are not embedded within non-text objects. However, the present invention is generalized to operate with any manner of embedding.

Now that a styled portion of the content has been placed into the control region on a page, the system needs to discover whether any additional nodes exist which may have text or embedded objects to be formatted and displayed within the control region. For this reason, the system begins a recursive procedure to move through the entire parse tree (although an iterative solution is diagrammed).

After displaying formatted text in the control region at state 614, the process 597 moves back to the parent of the current node at state 616 and resets the style to the parent style ID number at state 617. Once the style has been set to the style ID number of the parent node, the process 597 loops to state 603 where it queries whether more unread children exist in the parse tree.

If no more unread child nodes exist in the tree at decision state 603, the process 597 ends at the end state 604. If more children do exist, the process 597 walks to the next unread child node at state 605 and continues as discussed above.

Because text styles do not apply to embedded objects such as graphic images, a special subroutine handles displaying these objects into the control. Once the system determines that an embedded object resides in the leaf node at decision state 612, that object is loaded into the system memory at state 619 using the APIs LoadOleObject and InsertOleObject. Once the embedded object, such as an OLE object, has been loaded into the system at state 619, the process 597 checks at a decision state 621 whether a wrap style had been set for the object at state 609. If the set style was not a wrap style at decision state 621, the process 597 moves directly to display the embedded object in the control region at a state 622. In this case, the embedded object is displayed in the control region at the same point in the text when it was originally authored.

However, if a decision is made at decision state 621 that the embedded object did have a wrap style set at state 609, the process 597 positions the object to the correct place in the control region at a state 623. The position that the embedded object takes within the control region at state 623 is determined by referencing the style that was set at state 609 and is explained in more detail below in reference to FIG. 17.

Once the object has been positioned at the correct place in the control region at state 623, the process 597 displays the embedded object within the control region at state 622 and continues as discussed above.

FIG. 12b shows a schematic representation of content such as a MPML document that has already been parsed and attached to a particular title. As shown, a piece of content 627 includes a MPML parse tree 628. The parse tree 628 includes numerous nodes which correspond to particular tag IDs that affect the display of text and OLE objects in the content. For example, to read this parse tree, the system would first move to a node 629 which contains a tag <H1>. The node 629 indicates to the control that the content below it on the tree will contain the style associated with the <H1> tag. Once the system reaches this point in the tree, the style will be set as discussed in reference to the state 609 of FIG. 12a and the system will then move down to a next node 630.

As shown, the node 630 indicates to the control that all the content below it will be bold faced due to its <B> tag. The system sets a bold style and then moves down the tree to a leaf node 631 which contains text. The text in the leaf node 631 will then be formatted in the <H1> and bold style. For example, if the <H1> tag ID corresponded to a style ID number representing a HEADING 1 style, the properties defining a HEADING 1 style would be used to format the text in the leaf node. If the HEADING 1 style included text properties of Arial font 12 point, then the text at the leaf node 631 will be in that font type. In addition, text at the leaf node 631 will be bold faced because of the style set at the node 630.

Once the text at node 631 has been set to a <H1>/bold style and inserted into the control, the system begins recursing up through the nodes until it finds a node with additional children. In this case, the system will move up through node 630 and 629 until it reaches the node 628 which contains an additional child 632.

As shown in FIG. 12b, the node 632 indicates that a style corresponding to the tag <P> will be applied to all of the objects and text below it on the tree. Once the appropriate style for the tag <P> has been set, the system begins moving down through the tree until it reaches a leaf node. In this case, the system can move from node 632 to a node 633 which contains a <U> tag which is then set the style ID corresponding to the <U> tag by the system. After the appropriate style has been set at node 633, the system moves down one more node to a text leaf node 634.

Text at the leaf node 634 is then formatted in the styles corresponding to the <P> and <U> tags and inserted into the control. Once this text has been inserted into the control, the system begins recursing up through node 633 to node 632 wherein it determines that more children exist. Once the system reaches parent node 632 and determines that more children of this node exist, the style is set back to that corresponding to the <P> tag style before the system moves back down through the tree. After the parent tag has been set at node 632, the system moves down to a node 635 wherein it finds a <WA> tag indicating the node below it will have a wrap-advertisement style. The style corresponding to tag <WA> is then set and the system moves down to a leaf node 636 which contains an embedded object.

As shown in FIG. 12*b*, leaf node 636 is an embedded object which is then loaded into the system and displayed in a control region using the properties found in the <WA> style of node of 635. Once the OLE object at leaf node 636 has been inserted into the control, the system again begins recursing up through node 635 to parent 632. Once the system has reached parent 632 and realizes that more children exist at this node, the system sets the style to that of the node 632. Once the style ID has been set for node 632, the system moves down to a leaf node 637 which is formatted in the <P> tag format and displayed within the control region.

Now that the entire parse tree has been read, the system recurses up through node 632 to node 628 wherein it determines that all nodes have been read and the process terminates.

As shown in FIG. 12*c*, a control 638 uses a process 639 to match tag ID numbers their corresponding style ID numbers. The control 638 requests tag ID information from a parse tree 640. The control 638 then uses the returned tag ID number to find a corresponding style ID number at a state 642. In FIG. 12*c*, the control has found tag ID number 1 in the parsed content 640. The control 638 goes to a tag ID Lookup Table 644 to find the style ID number which corresponds to the retrieve tag ID. In this example, tag ID number 1 corresponds to a style ID number 5.

Once a style ID has been determined for a particular tag ID number, the process 639 locates the returned style ID number in a style ID lookup table 646 at a state 648. The style ID look-up table 646 is used to associate particular style ID numbers with their appropriate style properties. The associated style properties of style ID number 5 in this example are arial font, 10 point, in small caps. These associated properties are then applied to the returned text from the parsed content 640 to display styled content 640' in a control 638'.

The following Pseudo-code describes the process that the MP system uses for mapping tags to styles and applying styles to text. Note this process occurs during compose when the control instructs the viewer to begin composing content. Presently, the named interfaces are stored in the BBCT-L.OCX library in the MP system. While the following pseudo-code is one method of retrieving content into a control, one of ordinary skill in the art will realize that other similar methods could also accomplish the same function.

```
Compose( )
{
    while more to compose
        Get parse tree from viewer
        Compose sub-tree
        if done composing, exit while
        Tell viewer where compose stopped
}
Compose Element
{
    for each child remaining in the tree
        if leaf node
            ComposeLeaf of this node
        else
            PreElement
                ComposeElement (node)
                PostElement
}
PreElement
{
    tag id = Get tag id of this node
    style id = Viewer map tag id to style id.
    Setstyle(style id)   //   all subsequent InsertText will
                         //   use this style
}
PostElement
{
    Get parent node of this node
    tag id = Get tag id of parent node
    style id = Viewer map tag id to style id
    SetStyle(style id)   // set style back to parent style
                         // (InsertText uses this one now)
}
InsertText
{
    ApplyStyle
    insert text into text engine
}
ComposeLeaf
{
    if embedded object
        insert object into control
    else
        InsertText
}
SetStyle(style id)
{
    Query style sheet for style object with given style ID
    if paragraph style
        set current paragraph style to style ID
    else
        set current character style to style ID
{
ApplyStyle
{
    for each attribute in current character style
        if last character style value is different
            set value defined by current character style
    last character style = current character style
    for each attribute in current paragraph style
        if last paragraph style value is different
            set value defined by current paragraph style
    last paragraph style = current paragraph style
}
```

VII. DISPLAYING THE STYLED CONTENT

The following discussion describes the displayable result of applying style sheets to content.

A. Linking Style Sheets to Controls

Figure 13A:
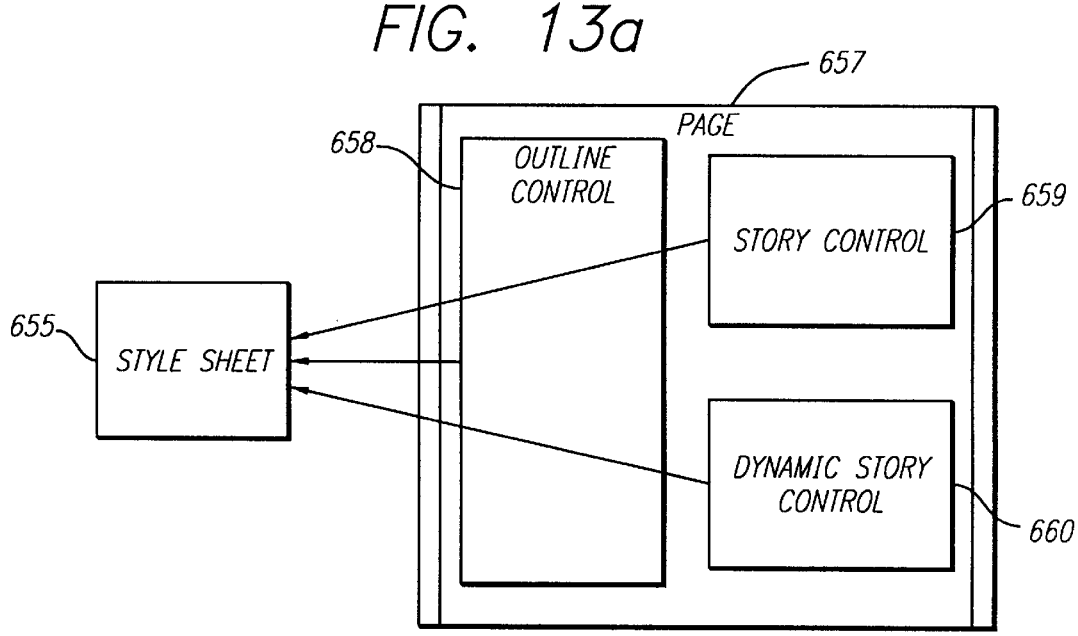
FIG. 13a is a diagram of multiple controls on a page referencing one style sheet.
Figure 13B:
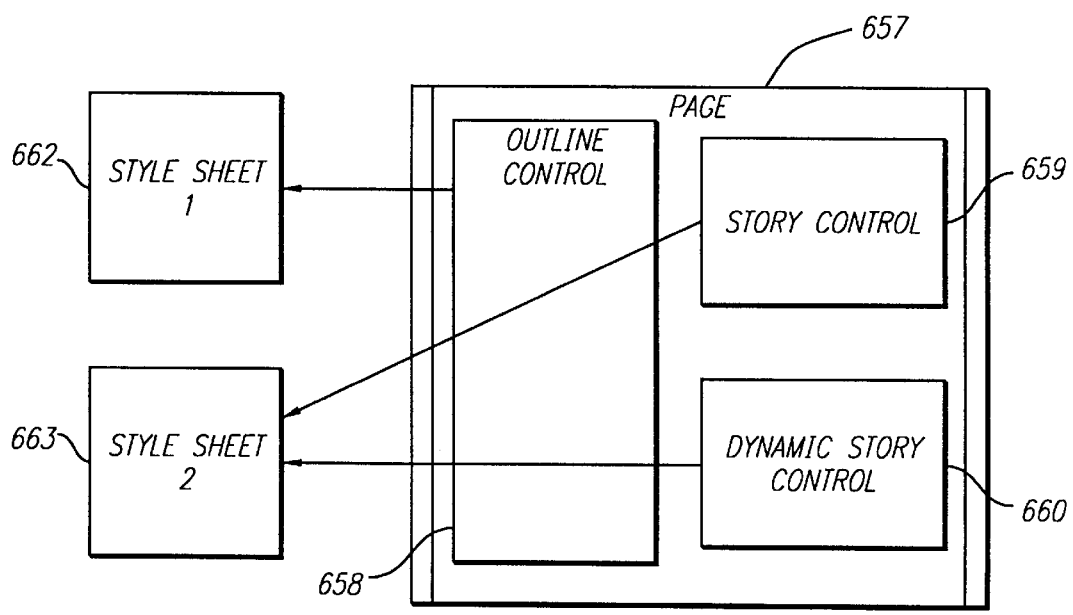
FIG. 13b is a diagram of multiple controls on a page referencing two different style sheets.

The process of associating style sheets to controls is diagrammed in FIGS. 13*a* and 13*b*. FIG. 13*a* shows a single style sheet 655 being referenced by controls on a page 657. An outline control 658, a story control 659, and a dynamic story control 660 are located on the page 657. All three controls on the page 657 reference the same style sheet 655. This diagram illustrates that multiple controls can all use the styles present in a single style sheet.

Therefore, a particular style, such as HEADING1, will appear the same in all three controls when rendered to the viewer. By linking the same style sheet to many controls, the publisher maintains a consistent set of styles throughout a set of stories. This is useful when the designer wants the look and feel of multiple stories to be the same.

However, as shown in FIG. 13b, it is also possible for the outline control 658 to reference a first style sheet 662 while the story control 659 and dynamic story control 660 reference a second style sheet 663. Although each control can only reference a single style sheet, it is not necessary for all the controls on a single page to reference the same style sheet. This is an important feature of the MP system because it allows the same tagged content to be displayed in various ways depending on the control. For example, a HEADING1 style in the first style sheet 662 may format text to be bold faced and red whereas the same HEADING1 style in the second style sheet 663 may format text as small caps and italicized. Therefore, content with a HEADING1 style that is rendered in the outline control 658 of FIG. 13b will appear bold faced and red. Any content with a HEADING1 style that is rendered in the story control 659 or dynamic story control 660 will appear as small caps and italicized. This is possible due to the application of style sheets to the separation of format and content within the MP system.

As has been discussed previously, the content stored in the MP system is not actually reformatted when instantiated by the viewer, it is only displayed in various formats by referencing the document tags to the linked style sheet. The displayed formats are not saved to the content object, but only appear to the user differently as they are displayed through the control. By giving the MP system the ability to link different style sheets to various controls on the same page, the publisher has tremendous flexibility for displaying the content of their story in a manner which is pleasing to the user.

Moreover, since the content is never reformatted, the publisher can modify a particular style sheet, so that the next time the user views a particular control on a particular page, the text will appear in an altered manner to all customers. Plus, the publisher only needs to change a single style in a particular style sheet to present the user with a different format for the content provided. This is explained more fully in reference to FIG. 14 wherein a tagged story is shown as being displayed in two separate styles.

B. Applying Two Style Sheets to the Same Content

Figure 14:
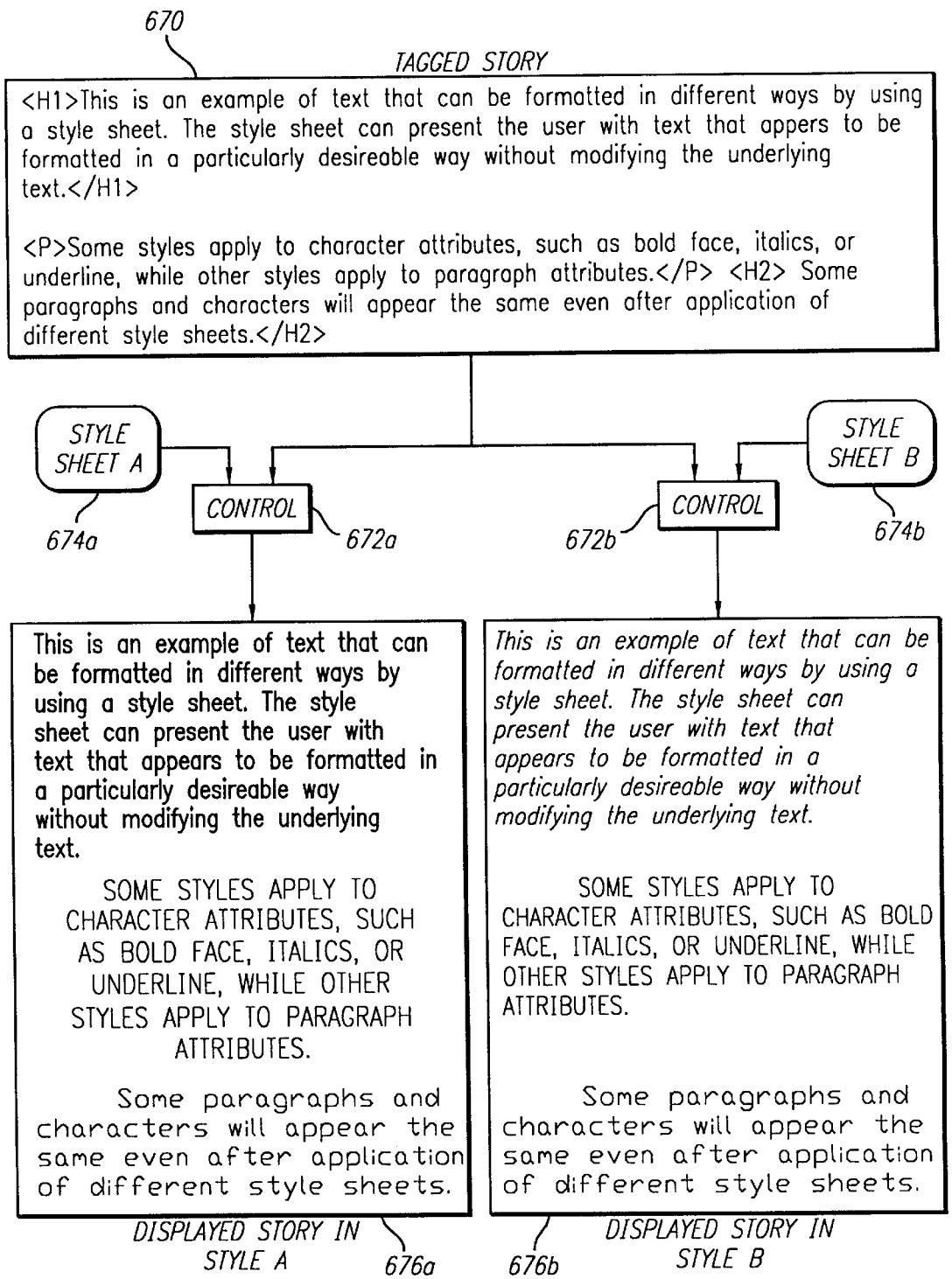
FIG. 14 is a block diagram illustrating the process of displaying the same tagged story by applying two different style sheets.

Referring now to FIG. 14, a tagged story 670 is placed in two controls 672a and 672b on a page in a MPS title. As shown, the tagged story 670 contains bracketed indices of a particular style. For example, the <H1> tag indicates that this is a HEADING1 style of text. Similarly the <P> tag of the second paragraph indicates that this is a Paragraph 1 style of text.

As shown, the tagged story 670 is pulled into the control 672a which has an associated style sheet 674a. Similarly, the tagged story is also brought into control 672b which has an associated style sheet 674b. Now referring to the displayed story 676a it can be seen that this story is displayed in a style which is different than the displayed story 676b. For example, the displayed story 676a has a first paragraph that is bold faced, a second paragraph that is centered in all caps and a third paragraph that is Courier style with the first line indented.

In comparison, the displayed story 676b has a first paragraph that is italicized, a second paragraph that is indented in small caps and a third paragraph which matches the third paragraph of displayed story 676a which is indented at the first line and in a Courier font. FIG. 14 shows that the same tagged story can be displayed in two different manners on two different controls by association of different style sheets. When the viewer displays the story using style sheet A, the text is formatted as shown in displayed story 656A. when the viewer displays the story using style sheet B, the story appears as displayed in 676b. Although the tagged story 670 is never reformatted, it gets displayed differently through the use of style sheets.

Although the previous discussions have concentrated on style properties of text material, it is also possible to tag graphical content with certain style properties in the MP system. As was discussed in reference to FIG. 9, the wrap property is used to tag graphical images with styles corresponding to their geographic position within a control. The wrap styles are discussed in more detail below in reference to FIG. 15.

C. Use of Wrap Properties to Format Images

Wrap edit process 700, which is a part of the style sheet editor 187 (FIG. 2) for setting up a wrap style in the style sheet is shown in FIG. 15. The process 700 begins at a start state 702 after which a new style sheet is added to the title at a state 704. The designer then opens a style sheet property dialog at state 706 and chooses a wrap style for the embedded object at a state 708. The possible wrap style choices are presented below in Table 5.

As shown in Table 5, there are currently eight different wrap styles available to the designer. Each of these styles is an object within the style sheet object container. A depiction of the structure of a style sheet container and its objects is shown in FIG. 9. A wrap style object contains property values which identify the position that images with this style should be placed into within a control region.

TABLE 5

Wrap Properties in a Style Sheet

| Style Name | Description |
| --- | --- |
| Wrap:Advertisement | Advertising Image |
| Wrap:Identifying graphic | A logo or other picture that uniquely identifies the story |
| Wrap:Custom 1 | Custom 1 |
| Wrap:Custom 2 | Custom 2 |
| Wrap:Design Feature | Chosen Design Feature |
| Wrap:Related Graphic | Graphic Image Related to Another Graphic |
| Wrap:Sidebar Graphic | Graphic Image Positioned on Side of Control |
| Wrap:Supporting Graphic | Graphic Image Which Supports Another Image |

The wrap styles shown in Table 5 are similar to character and paragraph properties as discussed above in that they allow the author to select a style that has associated properties which can be changed by the designer. However, unlike character and paragraph styles which reformat text, the wrap style properties define a geographic position on a page for displaying an embedded object. The method of choosing a geographic position for an embedded object within a control region is described in more detail below with reference to FIG. 16.

Figure 16:
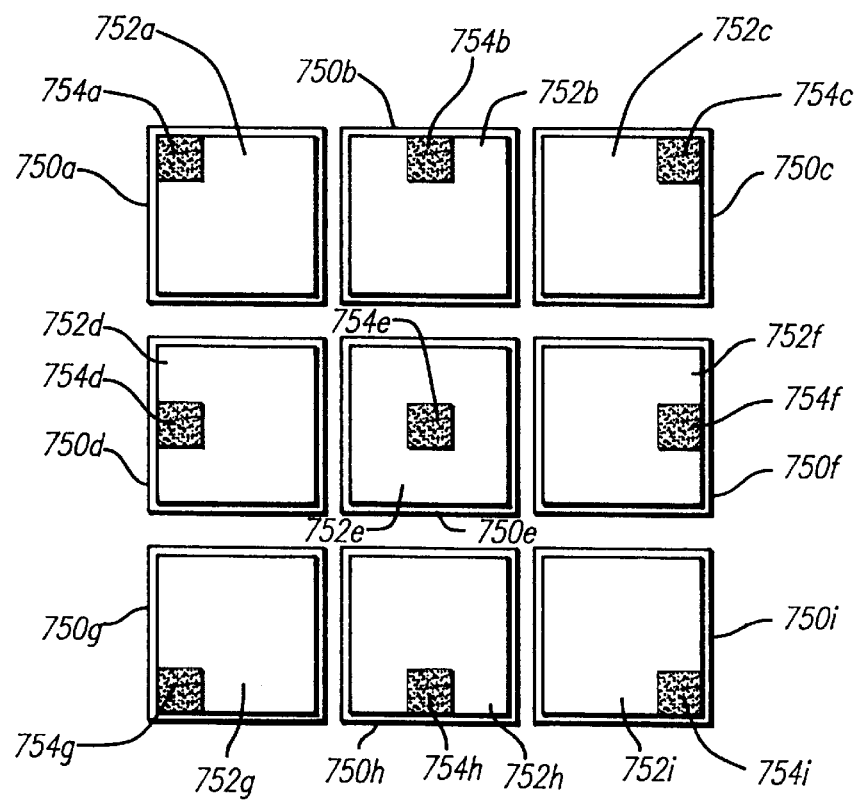
FIG. 16 is a diagram of various positions for an embedded object that a designer can set by choosing wrap styles in a style sheet as shown in the flow diagram of FIG. 15.

After choosing a wrap style, such as Wrap:Advertisement at state 708, the designer chooses to modify the properties of this style at a state 710. A grid illustrating nine possible geographic positions within a control display region is then displayed to the designer at a state 712. This grid is illustrated in FIG. 16. After choosing one of the geographic positions on the grid at state 712, the designer closes the style sheet dialog at state 716 and the process ends at an end state 718.

As discussed above, besides choosing the wrap style, the designer must also choose a position for the embedded object in a nine position grid. This is how the designer decides where in the control region that an embedded object will be displayed. As can be envisioned, many designers can choose to display the same content in various ways by choosing different positions for the embedded objects to be displayed. The method of choosing a particular location for the embedded objects within the control regions is discussed below in relation to FIG. 16.

Referring now to FIG. 16, a series of pages 750*a–i* are shown with each page having a control 752*a–i*. As shown in FIG. 15, there is one control 752 per page 750. Each of the nine controls shown in FIG. 15 has a single graphic image 754*a–i* placed within the control region. The graphic image 754 (a type of embedded object) is placed in one of nine positions within the control 752. For example, in control 752*d*, the graphic image 754*d* is placed centrally along the left edge of the control 752*d*. As shown in FIG. 16, there are nine possible positions for the graphic image 754.

The wrap property stream 508 illustrated in FIG. 9 defines the position of the graphic image 754 within a particular control. For example, the wrap property stream 508 could indicate that in control 752*d* the graphic image should be placed as shown in position 754*d*. The designer selects the wrap property's dialog from the style sheet editor to set the position of any graphical image that may appear within the control which references the chosen style sheet.

D. Laying out A Wrap in a Viewer

Figure 17:
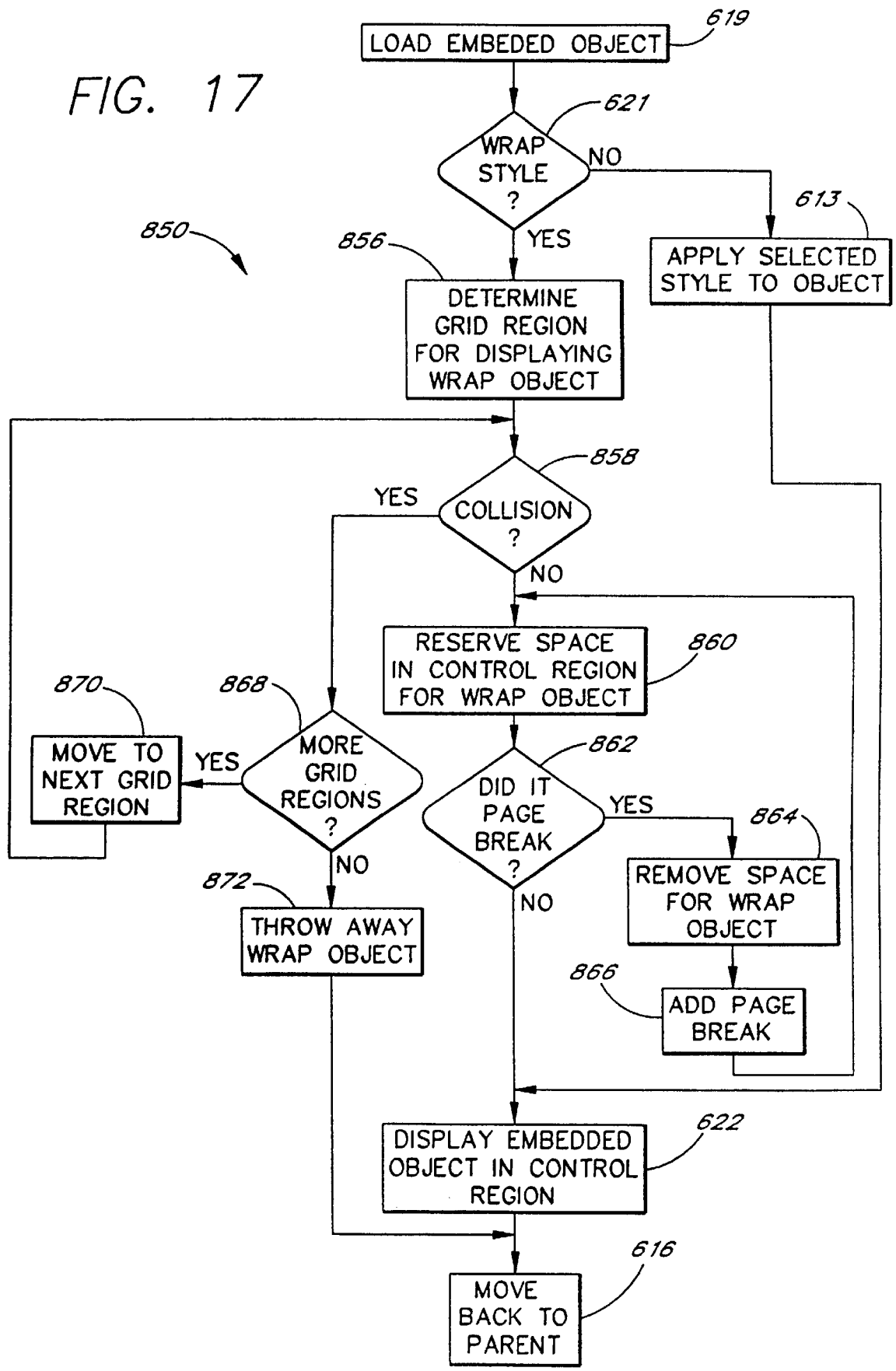
FIG. 17 is a flow diagram of the wrap process of applying a wrap style to an embedded object in the viewer shown in FIG. 2.

Wrap process 850, which is part of the viewer 202 (FIG. 2) for laying out an embedded object having an associated wrap style object in a control region is shown in FIG. 17. The process 850 is a more specific view of the process of handling wrap objects as illustrated in FIG. 15 and includes states 619, 621, 613, 622 and 616 from that figure. FIG. 17 begins with loading the embedded object to the control at a state 619. A decision is then made at decision state 621 whether or not the style is a wrap style. If the current style is a wrap style then the grid region for displaying the wrap object is determined at state 856. If the object has not been tagged as having an associated wrap style at decision state 621, the embedded object will automatically be treated as in-line and the selected styles will be applied at state 613. An embedded object that is displayed in-line will not have text that flows around the embedded object when displayed. Instead, the object will be displayed with text at the top and bottom of the object. By choosing a wrap style, the designer can allow text to flow around the object to make its display more pleasing to the customer.

An embedded object that has been tagged as a wrap style must be properly positioned. The position of the object on a nine-position grid is determined at state 856 wherein the grid property associated with the applied style is found. The grid property might be assigned the value of, for example, top right corner. Thus, the object will be positioned within the top, right corner of the control region. The position information for one of the nine positions is included within the property stream of the wrap style object (See FIG. 9).

Once the grid region for the object is determined at state 856, the wrap process 850 determines if the object will "collide" with another object in the control region at a decision state 858 when it is displayed. The process 850 uses decision state 858 to determine if there is a conflict with the chosen position of an embedded object and other previously placed embedded objects. If the chosen position of the object does not conflict or "collide" with another object at decision state 858, the chosen position of the object on the nine-position grid is reserved at a state 860.

After the chosen position is reserved at state 860, a decision is made whether the object caused a page break or not at a decision state 862. A page break would occur if the content already rendered on this page could not all fit on the same page once the space for the embedded object was rendered. If no page break occurs at decision state 862, the object is displayed in the control region at state 622.

However, if a page break does occur at decision state 862, the reserved space for the wrap object is removed from the current page at state 864 and a page break is added at state 866. Once the page break has been added, the process 850 loops back to state 860 where it reserves space on the newly added page for the embedded object.

If a chosen position causes the embedded object to conflict with or "collide" with an embedded object already allocated to the chosen position location at state 858, the process 850 decides whether more grid regions are available at a decision state 868. If more unevaluated grid regions are available at decision state 868, the process 850 moves to the next grid region at state 870 and then loops to determine whether there is a collision at the new grid position at decision state 858.

Thus, the decision of whether more grid regions are available involves an evaluation of the grid zones that remain (in top to bottom left to right order). Each location is checked at state 870 to determine if the position has already been allocated to an object that previously occurred in the text stream and thus has already been placed. If a vacant position is found, the position is reserved at state 860 and evaluated to determine if the object interferes with a page break at state 862. If no vacant locations are found, the process 850 discards the loaded object at state 872.

It should be noted that the actual object in the text content is not destroyed at state 872, just the loaded copy of the embedded object because there was no room within the control region to display the object. Once the object has been discarded at state 872 the process moves back to the parent at state 616.

In addition to using wrap styles to increase the flexibility of the MP system, colors schemes can be chosen by the designer which use permanent or variable system colors as described below.

VIII. ASSIGNING COLORS IN A CONTROL

Figure 18:
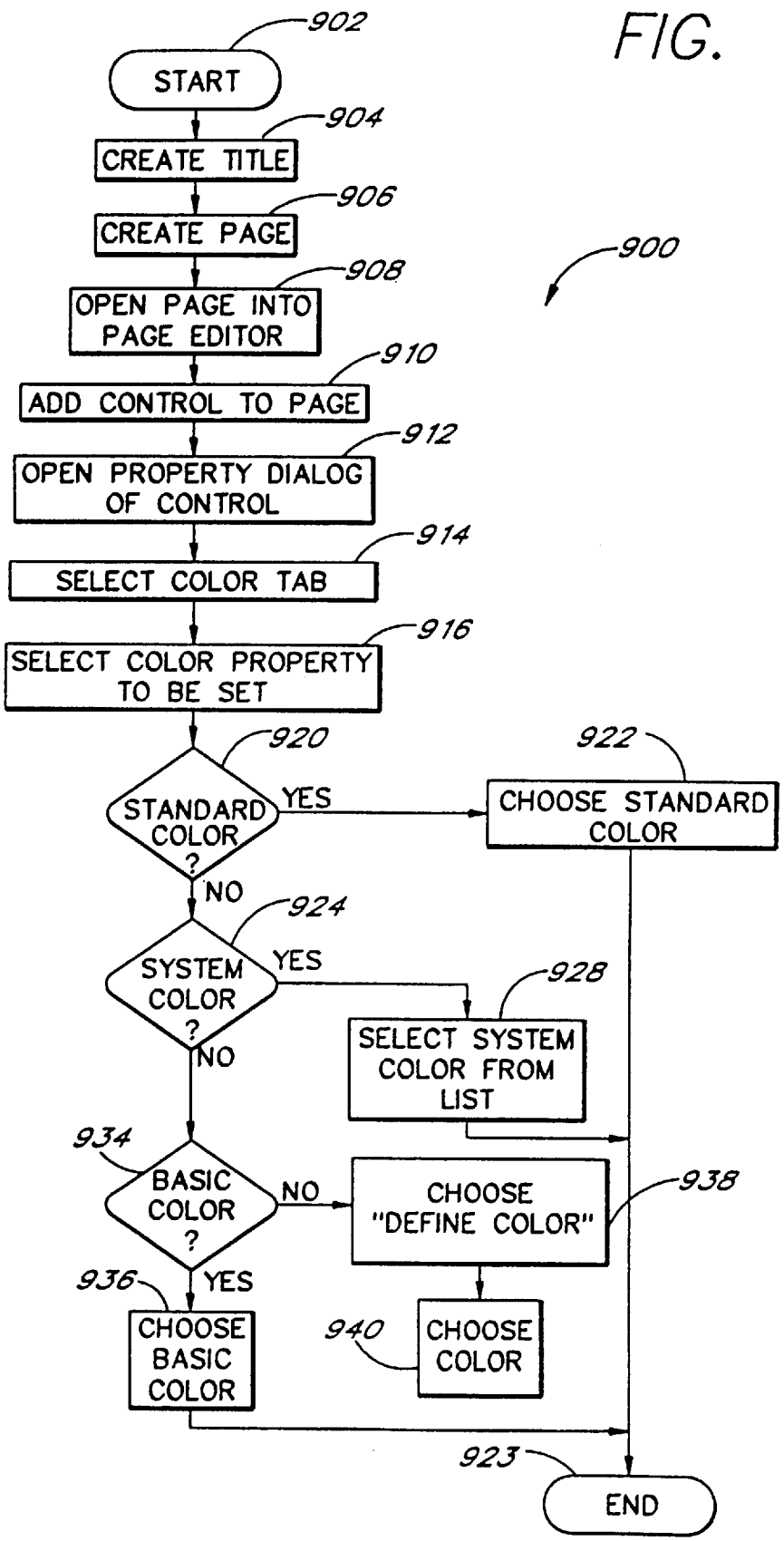
FIG. 18 is a flow diagram of the process used by the designer to assign colors to elements in the control.

Referring now to FIG. 18, a process 900 for assigning colors to controls is shown. The process 900, at the publisher workstation 102 (FIG. 2) begins at a start state 902. After the designer has created a title at state 904 and a page at state 906, the designer enters the page editor 186 (FIG. 2) at state 908. After the page editor is opened at state 908, a control is added to the page at a state 910 so that content can be displayed within a control region. The control that is added at state 910 can be any of the types of page controls described above.

Once the control has been added to the page at state 910, a property dialog for the control is opened at a state 912. To open the property dialog of the control the designer can select the chosen control with a mouse and choose the "modify" menu option, or press the right mouse button and choose "properties" from a pop-up menu. After the properties dialog is opened at state 912, the designer switches to the "colors" tab in the properties dialog at a state 914. The designer next chooses which color property to be set at state 916. Each type of control (e.g. Dynamic Story, Static Story, Caption Button, Picture, Outline) has its own set of color properties which can be set. For example, the background color and frame color are the only color properties that can be set for a picture control. However, a caption button control can have the background color, foreground color, bevel highlight and bevel shadow colors set.

After the designer has selected the control property to set at state 916, a decision of whether to set a standard color is made at a decision state 920. If the designer chooses to use a standard color at decision state 920, a standard color is chosen at a state 922 and the process 900 ends at an end state 923. If a standard color is chosen, the color scheme for the property selected at state 916 is permanently set. When the control is instantiated on the page, the chosen standard color will be used for the property that was selected at state 916. If, for instance, the selected property was the background color and the standard color set was green, then the control will be displayed with a green background. Thus, the Windows® color scheme defined by the customer will not affect standard colors.

A standard color is set by storing RGB values to an OLE_COLOR variable where the RGB values correspond to the standard color that is selected at state 922. To define a standard color in the OLE_COLOR variable, the first bit of the four byte representation of these colors is set to 0. The first byte is therefore 0000. The zero in the first bit of the first byte indicates that the provided color is a RGB color value and not a system color. Protocols for storing particular colors as RGB values are well known in the art.

If a decision is made at decision state 920 to not use a standard color, the designer chooses whether or not to use a system color at a decision state 924. If a decision is made to use a system color at decision state 924, a list of possible system color variables is displayed to the designer and the appropriate variable to assign the property is selected at a state 928. The variables that are displayed to the designer at state 928 correspond to specific Windows system colors. For example, one of the variables that can be chosen at state 928 is WINDOW FRAME.

If the designer selects a BACKGROUND color property to be set at state 916, then chooses to use a system color at state 924, and selects the WINDOW FRAME system color at state 928, the background color of the control will be rendered in the same color as the WINDOW FRAME color that is set in the customer's Windows® program. If the customer ever changes the color setting of the WINDOW FRAME, then the next time the control is rendered, the background color will appear in the newly selected color.

The value of the system color selected will be stored to the OLE_COLOR variable in one preferred embodiment of the invention. Assigning a system color to the OLE_COLOR variable sets the first bit of the four byte color code in OLE_COLOR to one. This setting indicates to the system that the value is a system color and not a standard color (thus the first byte is 1000). If a system color is selected, the next two bytes in OLE_COLOR will be set to 0 with the final byte specifying the particular windows system variable.

For example, if the last byte in the OLE_COLOR variable is set to the number six, then the control will know to use the WINDOW FRAME color setting from Windows. As another example, if the last byte is set to fourteen it will use the colors defined in Windows for HIGHLIGHTED TEXT. When the customer views content that has been rendered in a control having an OLE_COLOR value that defines a system color, the viewer will look to the colors set in the customer's Windows® program to determine the actual RGB color to assign. This is accomplished by translating the OLE_COLOR value into an RGB color value using the OleTranslateColor API.

If the designer chooses neither a standard color nor a system color at decision state 924, the designer chooses whether or not to use one of the 48 basic colors at a decision state 934. If the choice is made at decision state 934 to use a basic color, then a basic color is chosen at state 936 and the process 900 ends at end state 923. Basic colors are a set of standard Windows colors that are available from the Windows "Color Chooser" dialog. These colors are set very similarly to the way standard colors are set, by placing a zero in the first bit of the first byte of the OLE_COLOR variable. Depending on the choice of basic color, the remaining three bytes will be used for color encoding with the second byte indicating the shade of blue, the third byte determining the shade of green and the fourth byte providing information on the red content.

If a choice is made at decision state 934 to not use a basic color, the designer can choose to open a "DEFINE COLOR" dialog at a state 938 and choose a color from a palette of the 16 million available colors at a state 940. The RGB value chosen at state 940 will be stored to the OLE_COLOR variable in the same manner as the basic and standard colors, with the first byte being zero and the remaining three bytes corresponding to the RGB values for the chosen color. Once a color has been chosen at state 940, the process 900 ends at end state 923.

A. Accessing Colors in the Viewer

Figure 19:
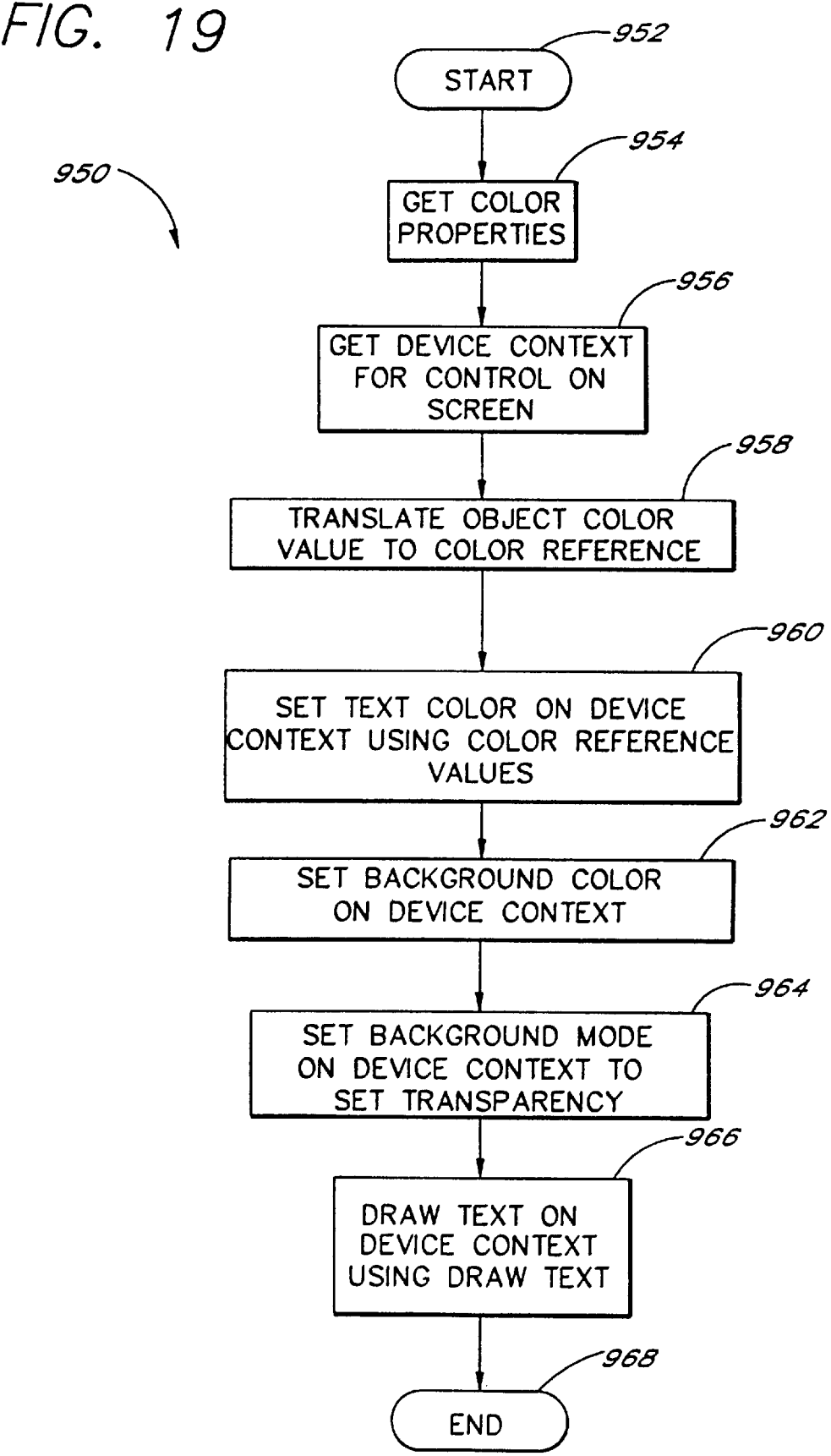
FIG. 19 is a flow diagram of the process used by the viewer to render colors according to instructions set by the designer.

Referring now to FIG. 19, a process 950 for using colors in the viewer 202 at a customer workstation 160 (FIG. 2) is shown. The process 950 beings at a start state 952. After a particular title or page to be displayed has been selected, the viewer 202 obtains the color properties of the controls at a state 954. Once the color properties of the control are received, the viewer gets a handle to the control window and requests a device context for the control window at a state 956.

A device context is an abstraction that Windows® provides for a region of the screen that can be drawn on. Device contexts allow the programmer to use the same APIs to render images and text on any number of devices without knowing the type of device. Common device contexts are regions of the screen, pages destined for the printer, and bitmaps. Windows can thereby recycle the resources it needs to maintain its drawing function. A device context has some states associated with it, including a current foreground color, background color and background mode that describes whether the background is transparent or opaque to the images below it on the screen.

After receiving the device context at state 956, the OLE_COLOR values that are stored in the properties table for each control are translated into COLORREF data types at a state 958. The translation from OLE_COLOR values to COLORREF data is done by the OLETranslateColor() API. This API takes the value of OLE_COLOR and maps it to the corresponding Windows COLORREF. More information on this API is provided in the APPENDIX.

The COLORREF value that is returned at state 958 enables the system to set the text color. Another API, SetTextColor takes the COLORREF value and returns an RGB value for the text color at a state 960. The system will use the specified COLORREF value for text color when writing text to the display device. If the device cannot represent the specified color, the system sets the text color to the nearest physical color.

The COLORREF value returned also enables the system to set a background color. A subroutine, SetBkColor takes the COLORREF value for the background color of the control and sets the background color to the appropriate RGB color at a state 962. After the background color is set at state 962, the background mode of the device context is set to the appropriate value at a state 964. The background mode is used to specify whether the control's background is transparent or opaque to objects behind it on the page.

After all the appropriate colors are specified as RGB values, the actual text is drawn on the device context by calling the DrawText API at state 966. The Drawtext API draws formatted text in a specified region defined by the device context and appropriately justifies the text to fit into the control window. More information on the Drawtext API is provided in the APPENDIX.

Because the MP system gives the designer a choice of whether to specify a particular color for a control or let the customer's Windows settings determine the color, the system has tremendous flexibility. For example, people with vision handicaps can set their Windows colors to be bright with high contrast so that pages in the MP system will appear in brighter than normal colors. Because system colors are determined by each customer, the colors most pleasing to the customer are used to display text and graphics. On the other hand, some content objects, such as company logos, will need to look exactly as the designer specifies and so will have fixed non-system colors. Thus, the flexibility to use system colors in addition to fixed colors in the MP system is an advantage over other presently known electronic publishing systems.

IX. SUMMARY

This section summarizes the benefits provided by the present invention. In the MP system, a content provider has a lot of flexibility to choose how a customer will view a story. In addition, the MP system is device independent in that the tagged content can be displayed with high quality on many different devices. For example, a content provider can create multiple titles to display the same content so that the customer can choose the appropriate title for viewing on a VGA screen with one column, a printer with many columns, a small screen personal digital assistant (PDA), an interactive television (ITV) system, a fax machine, or a notebook computer. Different styles can be applied to each of these devices so that the displayed content is formatted appropriately.

Moreover, separating the content and design in the MP system enables sending or distributing stylized high-quality publications over low-speed communications links. This results from the fact that the design and style sheets of many titles remains fairly static while only the content changes regularly. The MP system does not need to send large design descriptions and style sheets to customers' computers unless the designs or styles change. Content can typically be transmitted quickly since it consists of tagged components, not the actual pages and controls themselves. Thus the separation of design and content eliminates much of the communication overhead in an electronic publishing environment.

Further, the MP system supports standards such as Microsoft Word and Standard Generalized Markup Language (SGML) to ensure that the content provider's investment in existing tools can be fully leveraged. The MP system also reads standard HyperText Markup Language (HTML) documents so that existing HTML documents can be easily converted to more sophisticated applications. Additionally, through support of the OLE standard, tools that supports OLE server capabilities can be used to create content embedded in an MPS title. By supporting additional standard file formats, the MPS can also accommodate other tools (for example high-end graphic applications).

In addition to the advantages listed above, the MP system also has other advantages that differentiate this system from other on-line publishing systems. For example, graphic designers can work on the title and page layouts, while authors create content objects. There is a clean separation of responsibilities, with separate tools used by each professional.

Also, new content does not need to be laid out by a designer before it can be published. It can be uploaded to the distribution point and downloaded to customers' machines as soon as the object is completed, since the rendering is automatically done on the consumers' machines based upon the designs in the title's page layouts. Also, since no rendering has been done prior to downloading the title and objects to the consumer's machine, the appearance of a new piece of content does not force the system to re-download any other items.

As stated above, the styles contained in every style sheet are predefined by the MP system authoring program. This program is a version of the Microsoft Word® program, termed MPS Word, that has the special capability of producing documents formatted in Multimedia Publishing Markup Language (MPML). The MPML is a form of an SGML, but has formatting commands unique to the MP system. Markup Languages which are well known in on-line networks identify portions of documents by embedded tags. In an MPML document, there is one MPML tag per document portion and each tag is mapped to a style that is found in a style sheet.

In addition to defining the linkage between tag IDs and styles, the style sheet provides information about each style such as whether it is a character or paragraph style and the default property values assigned to each style. These default values are used to promote formatting and display standards within the MP system. For example, by giving specific styles a particular default property, display standards can be introduced to the MP system. By placing default values in the HEADING1 style, the display, by default, will show top level headings in a standard font style and size. By providing these styles as defaults, designers can override unwanted style definitions but don't have to choose definitions for every style in their publication. In addition, the MP system is extensible to permit new styles to be added to the default style sheet if necessary.

In the MP system, the title creates a default style sheet containing styles with specific default values. If a designer wishes to define custom properties for particular styles, a new style sheet is created and linked to the control. However, the custom style sheet only preferably contains information for modified styles. If a control looks to the custom style sheet for a particular style that has not been modified, the custom style sheet points the control back to the default style sheet. In this manner, styles from the default style sheet are used when a custom style sheet does not contain modified properties for a given style name. Preferably, when a MPS control requests a style object from its style sheet, that style sheet will first attempt to locate an associated style object within its collection and return it.

Because the custom style sheet will advantageously point the control to the default style sheet to retrieve unmodified styles, the custom style sheet can remain very compact. This flow through system of storing only modified styles in the new style sheets reduces the amount of memory used per custom style sheet to only those styles which the designer wishes to explicitly override.

In addition to the basic function of collecting a set of style objects, style sheets provide some basic housekeeping functions to make use of styles more efficient. In particular, style sheets manage properties which are shared among the styles it contains. For example, many styles may use the same font name or foreground/background colors. These shared properties are preferably stored in the style sheet object and referenced by the style object using a specific ID rather than having each style object hold a font name that would be duplicated in every style.

Although the invention has been described with reference to specific embodiments, the description is intended to be illustrative of the invention and is not intended to be limiting. Various modifications and applications may occur to those skilled in the art without departing from the true spirit of the invention as defined in the appended claims.

APPENDIX

OleTranslateColor

A helper API is provided to help manage mapping an OLE_COLOR value to the matching Windows COLORREF value. The helper routines, under Windows 95, return a reasonable default RGB value when asked for those indices.

STDAPI OleTranslateColor (OLE_COLOR color, HPALETTE hpal, COLORREF * pcolorref);

This API takes a value type OLE_COLOR and maps it to the corresponding Windows COLORREF. Table 6 below defines how the conversion happens, based on the input color value, and shows what the output COLORREF will be. Note that NULL may be passed for lpcolorref, in which case this API is simply verifying that color has a valid value.

TABLE 6

Mapping of Colors Use OleTranslateColor

| Color | hpal | Resulting |
|---|---|---|
| invalid | don't care | Error |
| 0x800000xx, xx is not a valid GetSysColor$_0$ index. | don't care | Error |
| 0x0100iiiii, iiiii is not valid for hpal | valid palette | Error |
| 0x800000xx, xx is a GetSysColor$_0$ index | NULL | 0x00bbggrr |
| 0x0100iiiii, iiiii is a palette index | NULL | 0x0100iiiii |
| 0x02bbggrr (palette relative) | NULL | 0x02bbggrr |
| 0x00bbggrr | NULL | 0x00bbggrr |
| 0x800000xx, xx is a GetSysColor$_0$ index | valid palette | 0x00bbggrr |
| 0x0100iiiii, iiiii is a valid palette index in hpal | valid palette | 0x0100iiiii |
| 0x02bbggrr (palette relative) | valid palette | 0x02bbggrr |
| 0x00bbggrr | valid palette | 0x02bbggrr |

CDC::DrawText virtual int DrawText (LPCTSTR lpszString, int nCount, LPRECT lpRect, UNIT nFormat);

Return Value

The height of the text if the function is successful.

| Parameters | |
|---|---|
| lpszString | Points to the string to be drawn. If nCount is −1, the string must be null-terminated. |
| nCount | Specifies the number of bytes in the string. If nCount is −1, then lpszString is assumed to be a long pointer to a null-terminated string and DrawText computes the character count automatically. |
| lpRect | Points to a RECT structure or CRect object that contains the rectangle (in logical coordinates) in which the text is to be formatted. |
| nFormat | Specifies the method of formatting the text. It can be any combination of the following values (combine using the bitwise OR operator); |

DT_BOTTOM—Specifies bottom-justified text. This value must be combined with DT_SINGLELINE.

DT_CALCRECT—Determines the width and height of the rectangle. If there are multiple lines of text, DrawText will use the width of the rectangle pointed to by lpRect and extend the base of the rectangle to bound the last line of text. If there is only one line of text, DrawText will modify the right side of the rectangle so that it bounds the last character in the line. In either case, DrawText returns the height of the formatted text but does not draw the text.

DT_CENTER—Centers text horizontally.

DT_EXPANDTABS—Expands tab characters. The default number of characters per tab is eight.

DT_EXTERNALLEADING—Includes the font's external leading in the line height. Normally, external leading is not included in the height of a line of text.

DT_LEFT—Aligns text flush-left.

DT_NOCLIP—Draws without clipping. DrawText is somewhat faster when DT_NOCLIP is used.

DT_NOPREFIX—Turns off processing of prefix characters. Normally, DrawText interprets the ampersand (&) mnemonic-prefix character as a directive to underscore the character that follows, and the two-ampersand (&&) mnemonic-prefix characters as a directive to print a single ampersand. By specifying DT_NOPREFIX this processing is turned off.

DT_RIGHT—Aligns text flush-right.

DT_SINGLELINE—Specifies single line only. Carriage returns and linefeeds do not break the line.

DT_TABSTOP—Sets tab stops. The high-order byte of nFormat is the number of characters for each tab. The default number of characters per tab is eight.

DT_TOP—Specifies top-justified text (single line only).

DT_VCENTER—Specifies vertically centered text (single line only).

DT_WORDBREAK—Specifies word-breaking. Lines are automatically broken between words if a word would extend past the edge of the rectangle specified by lpRect. A carriage return-linefeed sequence will also break the line.

Note that the values DT_CALCRECT, DT_EXTERNALLEADING, DT_INTERNAL, DT_NOCLIP, and DT_NOPREFIX cannot be used with the DT_TABSTOP value.

This routine draws formatted text in the rectangle specified by lpRect. It formats text by expanding tabs into appropriate spaces, aligning text to the left, right, or center of the given rectangle, and breaking text into lines that fit within the given rectangle. The type of formatting is specified by nFormat.

This member function uses the device context's selected font, text color, and background color to draw the text. Unless the DT_NO-CLIP format is used, DrawText clips the text so that the text does not appear outside the given rectangle. All formatting is assumed to have multiple lines unless the DT_SINGLELINE format is given.

If the selected font is too large for the specified rectangle, the DrawText member function does not attempt to substitute a smaller font.

If the DT_CALCRECT flag is specified, the rectangle specified by IpRect will be updated to reflect the width and height needed to draw the text.

If the TA_UPDATECP text-alignment flag has been set (see CDC::SetTextAlign), DrawText will display text starting at the current position, rather than at the left of the given rectangle. DrawText will not wrap text when the TA_UPDATE flat has been set (that is, the DT_WORDBREAK flag will have no effect). The text color may be set by CDC::SetTextColor.

CDC::SetTextColor
virtual COLORREFF SetTextColor(COLORREF crColor);
Return Value
An RGB value for the previous text color.
Parameters
crColor—Specifies the color of the text as an RGB color value.

This routine sets the text color to the specified color. The system will use this text color when writing text to this device context and also when converting bitmaps between color and monochrome device contexts.

If the device cannot represent the specified color, the system sets the text color to the nearest physical color. The background color for a character is specified by the SetBkColor and SetBkMode member functions.

CDC::SetBkColor
virtual COLORREF SetBkColor (COLORREF crColor);
Return Value
The previous background color as an RGB color value. If an error occurs, the return value is 0x80000000.
Parameters
crColor—Specifies the new background color.

This routine sets the current background color to the specified color. If the background mode is OPAQUE, the system uses the background color to fill the gaps in styled lines, the gaps between hatched lines in brushes, and the background in character cells. The system also uses the background color when converting bitmaps between color and monochrome device contexts.

If the device cannot display the specified color, the system sets the background color to the nearest physical color.

We claim:

1. A method of styling document content, comprising the steps of:
creating a title including page layouts representing the appearance of pages of the title;
creating a first style sheet container storing a first plurality of styles;
creating a second style sheet container storing a second plurality of styles;
creating at least one content container for storing document content;
providing a first control on a first one of the page layouts for delineating a first page layout area where content is to be rendered;
providing a second control on a second one of the page layouts for delineating a second page layout area where content is to be rendered;
linking the content container with the first and second controls;
linking the first control to the first style sheet container;
linking the second control to the second style sheet container;
rendering content in the first page layout area according to at least one of the first plurality of styles; and
rendering content in the second page area according to at least one of the second plurality of styles.

2. The method of claim 1, wherein at least one of the styles is selected from the group consisting of paragraph styles, character styles and wrap styles.

3. The method of claim 1, wherein at least one of the first and second style sheet containers comprise styles for image and textual content.

4. The method of claim 1, further comprising the step of providing each control with a setting corresponding to the location of content to be displayed by the control.

5. The method of claim 1, wherein at least one of the steps of linking the first control to the first style sheet and linking the second control to the second style sheet further comprises the step of loading the respective style sheet from a cache object store.

6. The method of claim 1, wherein the step of linking the first control to the first style sheet and the step of linking the second control to the second style sheet comprise the step of associating with the respective control with a globally unique identifier associated with the respective style sheet.

7. The method of claim 1, wherein the step of creating a first and second control further comprises the step of creating a static story control.

8. The method of claim 1, wherein the step of creating a first and second control further comprises the step of creating a dynamic story control.

9. A viewer for rendering a title, the title including at least one page layout representing a desired appearance of a respective page of the title, the title having at least one content object associated therewith representing content of at least one document, the viewer comprising:
a computer, including a storage;
a display operatively associated with the computer;
the content object being stored in the storage;
at least one style sheet stored in the storage separately from the content object; and
a control stored in the storage, the control delineating an area of the page layout and being linked to at least one of the content objects and at least one of the style sheets such that content rendered in the delineated page layout area is formatted according to the linked style sheet.

10. The viewer of claim 9, wherein the content object comprises text content.

11. The viewer of claim 9, wherein the content object comprises image content.

12. The viewer of claim 9, further comprising a second control stored in the storage, the second control delineating a second area of the page layout and being linked to at least a second one of the content objects and a second one of the style sheets.

13. The viewer of claim 9, further comprising a second control stored in the storage, the second control delineating a second area of the page layout, the first and second controls being linked to the same content object.

14. The viewer of claim 9, wherein the style sheet includes styles from the group consisting of character styles, wrap styles or paragraph styles.

15. The viewer of claim 9, wherein the content object contains tagged content.

16. In an electronic publication system including a storage, a method of publishing and viewing a title, the method comprising the steps of:

creating a content object representing content of a document associated with the title;

creating at least one page layout representing a desired layout of a page of the title;

creating a control object delineating an area of the page layout where the content is to be rendered;

creating a style sheet object including at least one style sheet representing a desired format for the content;

linking the style sheet object to the control object;

linking the content object to the control object;

storing with a publishing workstation the page layout, content object, the style sheet object and the control object in the storage;

retrieving with a customer workstation the page layout, content object, style sheet object and control object from the storage; and rendering the content on a display of the customer workstation, the content being rendered in the delineated page layout area according to the format represented in the linked style sheet.

17. In a publishing and distribution system including at least one publishing workstation for creating a title and at least one customer workstation for rendering the title, a publishing method comprising the steps of:

creating a content folder containing at least one content object, the content object representing the information associated with the title;

creating a title folder for containing the title;

creating at least one layout object on the publishing workstation, the layout object representing the layout of at least one page of the title, the layout object including a control object containing at least one control delineating a respective area of the layout page in which content is to be rendered;

creating a style object containing at least one style sheet representing a desired format for the content;

linking the control object with a respective content object;

linking the style object with the control object;

storing the layout object in the title folder; and rendering the page of the title on a display of the customer workstation by:

selecting the page; and rendering the linked content in the respective page layout area delineated by the control in the format represented by the style sheet in the linked style object.

18. The method according to claim 17, wherein the step of creating a content folder further comprises the step of creating tagged content.

19. The method according to claim 17, wherein the step of creating a layout object further comprises the step of creating search objects for drawing content from the content object.

20. The method according to claim 17, wherein the step of creating a control object includes the step of creating a static story control.

21. The method according to claim 17, wherein the step of creating a control object includes the step of creating a dynamic story control.

22. The method according to claim 17, further comprising the step of modifying the style sheet on the publisher workstation after the step of rendering the title on a display of the customer workstation.

23. The method according to claim 17, wherein the step of rendering the title on the customer workstation further comprises the steps of:

parsing content represented in the content object to determine a tag identifier; and determining a style property from the style sheet based on the tag identifier.

24. The method of claim 17, further comprising the step of providing each control with a setting representing the location of content to be displayed by that control.

25. The method of claim 17, wherein the step of rendering the title on the customer workstation comprises the step of loading the style sheet from a cache object store.

26. The method of claim 17, wherein the step of rendering the title on the customer workstation comprises the step of associating with the control with a globally unique identifier identifying the style sheet.

27. The method of claim 17, wherein the control object comprises two controls and wherein the step of rendering the title on the customer workstation comprises the step of rendering the same content with both controls.

28. In a publishing system including at least one publishing workstation for creating a title, a publishing method comprising the steps of:

creating a content folder containing at least one content object, the content object representing the information associated with the title;

creating a title folder for containing the title;

creating at least one layout object on the publishing workstation, the layout object representing the layout of at least one page of the title, the layout object including a control object containing at least one control delineating a respective area of the layout page in which content is to be rendered;

creating a style object containing at least one style sheet representing a desired format for the content;

linking the control object with a respective content object;

linking the style object with the control object; and storing the layout object in the title folder.

29. The method according to claim 28, wherein the content object represents tagged content.

30. The method according to claim 28, wherein the layout object comprises search objects for drawing content from the content object.

31. The method according to claim 28, wherein the control object includes a static story control.

32. The method according to claim 28, wherein the control object includes a dynamic story control.

33. The method according to claim 28, further comprising the step of modifying the style sheet after the step of storing the layout object.

34. The method of claim 28, wherein the style sheet is provided with a globally unique identifier.

35. The method of claim 28, wherein the step of creating a layout object comprises the step of creating a control object representing two controls and wherein the step of linking the control object to the content object comprises linking both controls to the same content.

* * * * *